(12) United States Patent
Caspi

(10) Patent No.: US 11,777,782 B2
(45) Date of Patent: Oct. 3, 2023

(54) METHODS AND APPARATUS FOR INTERACTIVE SOCIAL TV MULTIMEDIA COMMUNICATION

(71) Applicant: Ram Caspi, Sunnyvale, CA (US)

(72) Inventor: Ram Caspi, Sunnyvale, CA (US)

(*) Notice: Subject to any disclaimer, the term of this patent is extended or adjusted under 35 U.S.C. 154(b) by 0 days.

(21) Appl. No.: 17/515,094

(22) Filed: Oct. 29, 2021

(65) Prior Publication Data
US 2022/0060368 A1 Feb. 24, 2022

Related U.S. Application Data

(63) Continuation of application No. 16/520,321, filed on Jul. 23, 2019, now Pat. No. 11,190,389, which is a (Continued)

(51) Int. Cl.
*H04L 12/24* (2006.01)
*H04L 41/04* (2022.01)
(Continued)

(52) U.S. Cl.
CPC .......... *H04L 41/04* (2013.01); *H04L 65/1069* (2013.01); *H04L 65/1083* (2013.01);
(Continued)

(58) Field of Classification Search
CPC ............... H04L 65/1069; H04L 65/403; H04L 65/1083; H04L 65/4015; H04L 51/52; H04L 51/10; H04L 41/04; H04N 21/63775; H04N 21/6371; H04N 21/4316; H04N 21/6125; H04N 21/47214; H04N 21/4788; H04N 21/632; H04N 21/43076; H04N 21/242; H04N 21/4307
See application file for complete search history.

(56) References Cited

U.S. PATENT DOCUMENTS 8,584,174 B1* 11/2013 Fyock ............... H04N 21/4316
725/60
2007/0229651 A1* 10/2007 Nakajima .......... H04N 21/6371
348/14.07
(Continued)

*Primary Examiner* — Jungwon Chang
(74) *Attorney, Agent, or Firm* — Etherton Law Group, LLC

(57) ABSTRACT

Embodiments of the invention provide a method and apparatus for establishing a synchronized interactive multimedia communication among a plurality of users. The method includes generating, at a first device, first information associated with a multimedia content selected by a first user. The first information is generated based on parameters. The method includes transmitting the first information to a second user. The first and second user is associated with a social computer network. Further, the method includes, at second devices, receiving the first information from the social network. The method includes processing the first information to establish a synchronized multimedia interactive communication between the second and the first user. The presentation of the multimedia content in the synchronized interactive multimedia communication is synchronized among the first device and the second device(s). The synchronized interactive multimedia communication is performed along with the presentation of the multimedia content.

9 Claims, 15 Drawing Sheets

Related U.S. Application Data continuation of application No. 13/596,640, filed on Aug. 28, 2012, now Pat. No. 10,419,266, which is a continuation of application No. 13/192,434, filed on Jul. 27, 2011, now Pat. No. 9,252,950, which is a continuation of application No. 13/116,772, filed on May 26, 2011, now abandoned.

(60) Provisional application No. 61/349,214, filed on May 28, 2010.

(51) Int. Cl.
| | |
|---|---|
| *H04L 65/1069* | (2022.01) |
| *H04L 65/1083* | (2022.01) |
| *H04L 65/403* | (2022.01) |
| *H04N 21/242* | (2011.01) |
| *H04N 21/43* | (2011.01) |
| *H04L 51/10* | (2022.01) |
| *H04L 51/52* | (2022.01) |

(52) U.S. Cl.
CPC ............ *H04L 65/403* (2013.01); *H04L 51/10* (2013.01); *H04L 51/52* (2022.05); *H04N 21/242* (2013.01); *H04N 21/4307* (2013.01)

(56) References Cited

U.S. PATENT DOCUMENTS

| | | | | |
|---|---|---|---|---|
| 2008/0313278 | A1* | 12/2008 | Hochberg | H04N 21/6125 709/204 |
| 2010/0064307 | A1* | 3/2010 | Malhotra | H04N 21/63775 725/86 |
| 2010/0174783 | A1* | 7/2010 | Zarom | H04L 65/403 709/205 |
| 2010/0188575 | A1* | 7/2010 | Salomons | H04N 5/50 348/553 |
| 2011/0289155 | A1* | 11/2011 | Pirnazar | G06F 16/954 709/250 |
| 2011/0289157 | A1* | 11/2011 | Pirnazar | H04L 51/52 709/227 |

\* cited by examiner

METHODS AND APPARATUS FOR INTERACTIVE SOCIAL TV MULTIMEDIA COMMUNICATION

CROSS REFERENCE TO RELATED APPLICATIONS

This Application is a continuation of U.S. patent application Ser. No. 16/520,321 filed Jul. 23, 2019 which is a continuation of U.S. patent application Ser. No. 13/596,640 filed Aug. 28, 2012, which is a continuation of U.S. patent application Ser. No. 13/192,434 filed Jul. 27, 2011, which is a continuation of U.S. patent application Ser. No. 13/116,772 filed May 26, 2011, which claims priority to U.S. Provisional Patent Application Ser. No. 61/349,214 filed on May 28, 2010, each of which is incorporated herein by reference in its entirety.

FIELD OF THE INVENTION

The invention relates to communication management and more specifically the invention relates to method and apparatus for establishing synchronized interactive multimedia communication among multiple users or devices in a computer network.

BACKGROUND OF THE INVENTION

Computer networks such as the Internet are a boon to people who like to socialize. Social computer networking websites provide a platform to users from all over the world to interact and share views on topics of similar interests. Social computer networking websites provide advancements especially in communication and self expression to various users. The users may create or join virtual communities based on their interests and can also share one or more resources via these virtual communities. The users can use the social computer networking websites to be in touch with their friends who are remotely located, to manage their contacts, to post their music, photos, multimedia content and other works so that their skills could be noticed by other professionals. The social computer networking websites may be used by various companies to enhance their business. The companies may use these social computers networking websites to promote their services and products. Further, job seekers and those who need to promote themselves online may also use social computer network as a way to achieve their goal. Many people use social computer networking websites for exchanging information about entertainment topics. These websites can be accessed from different types of devices, like PCs but also set-top boxes, Digital Video Recorders, Smart TVs and Home Media Gateways.

Typically, a user has different alternative of sharing the information of a currently watched and/or scheduled multimedia content with friends who are geographically remote from them. Examples of multimedia content include television programs, Internet videos, video-on-demand, Internet radio and so forth. The user can call his/her friends on their phones, or use a Short Messaging Service (SMS) or an instant messaging service to inform his/her friends about likings, plan to watch or discuss about the multimedia content. Alternatively, the user can communicate with his/her friends through videoconferencing or regular phone lines for exchanging information and coordinating a specific time to watch a future scheduled TV program. The user can also use standard E-mail for sending invitations and asking friends to watch future scheduled TV programs together with them. All back and forth coordination of these attempts is done manually and may also involve different types of devices.

Generally, young and mature users engage in message sharing activities through these social computer networking websites such as Facebook, Orkut, Twitter, and so forth. The message sharing activities also provide them a channel to share information about the multimedia content such as TV programs currently being watched as well as future scheduled TV programs with their friends or family members located in different part of the town. The users may require various stand alone equipments or applications to achieve all these features. However, performing all of these steps manually may be complicated.

In light of the above discussion techniques are desirable to establish and manage interactive multimedia communication among different users to achieve information sharing.

SUMMARY

The present invention provides a method Embodiments of the invention provide a method and apparatus for establishing a synchronized interactive multimedia communication among a plurality of users. The method comprises, at a first device connected to a computer network, generating first information associated with a multimedia content selected by a first user, the first information is generated based on one or more parameters; and transmitting the first information to at least one second user, each of the at least one second user and the first user are associated with a social computer network. The method comprises, at one or more second devices connected to the computer network, receiving the first information from the social computer network; and processing the first information to establish a synchronized multimedia interactive communication between at least one of the at least one second user and the first user, presentation of the multimedia content in the synchronized interactive multimedia communication is synchronized among the first device and the one or more second devices, further wherein the synchronized interactive multimedia communication is performed along with the presentation of the multimedia content.

The present invention also provides a method for establishing a synchronized interactive multimedia communication among a plurality of users. The method comprising, at a first device connected to a computer network, generating first information associated with a multimedia content selected by a first user, wherein the information is generated based on one or more parameters; transmitting the first information to at least one second user, wherein each of the at least one second user and the first user are known to each other; generating a first key for authenticating the synchronized interactive multimedia communication, wherein the first key is generated based on one or more first parameters provided by the first user; and presenting the first key to each of the at least one second user for establishing the synchronized interactive multimedia communication. The message also comprises, at one or more second devices connected to the computer network, receiving the first information from the computer network; generating a second key for authenticating the synchronized interactive multimedia communication, wherein the second key is generated based on one or more second parameters provided by the at least one second user; presenting the second key to the first user for establishing the synchronized interactive multimedia communication; processing the first information to establish the synchronized interactive multimedia communication between the at least one of the first user or the at least one second user, wherein the synchronized interactive multimedia communication is synchronized among the first device and the one or more second devices based on the first key and the second key, further wherein the synchronized multimedia interactive communication is performed along with the presentation of the multimedia content.

The present invention also provides an apparatus for establishing a synchronized interactive multimedia communication among a plurality of users. The apparatus comprises a first device connected to a computer network. The first device comprises a first generator configured to generate first information associated with a multimedia content selected by a first user. The first information is generated based on one or more parameter. The first device also comprises a first transceiver configured to transmit the first information to at least one second user. Each of the at least one second user and the first user are associated with a social computer network. The apparatus further comprises one or more second devices connected to the computer network. The one or more second devices comprise a second transceiver configured to receive the first information from the social computer network. The one or more second devices also comprises a second analyzer configured to process the first information to establish a synchronized interactive multimedia communication between at least one of the at least one second user and the first user. The presentation of the multimedia content in the synchronized interactive multimedia communication is synchronized among the first device and the one or more second devices. Further, the synchronized interactive multimedia communication is performed along with the presentation of the multimedia content.

The present invention also provides an apparatus for establishing a synchronized interactive multimedia communication among a plurality of users. The apparatus comprises a first device connected to a computer network. The first device comprises a first generator configured to generate first information associated with a multimedia content selected by a first user. The information is generated based on one or more parameters. The first generator is also configured to generate a first key for authenticating the interactive multimedia session. The first key is generated based on one or more first parameters provided by the first user. The first device also comprises a first transceiver configured to transmit the first information to at least one second user. Each of the at least one second user and the first user are known to each other. The first transceiver is also configured to present the first key to each of the at least one second user for establishing the synchronized interactive multimedia communication. The apparatus also comprises one or more second devices connected to the computer network. The one or more second devices comprise a second transceiver configured to receive the first information from the computer network. The second transceiver is also configured to present a second key to the first user for establishing the synchronized interactive multimedia communication. The one or more second devices also comprise a second generator configured to generate the second key for authenticating the synchronized interactive multimedia communication. The second key is generated based on one or more second parameters provided by the at least one second user. The one or more second devices also comprises a second analyzer configured to process the first information to establish the synchronized interactive multimedia communication between the at least one of the first user or the at least one second user. The synchronized interactive multimedia communication is synchronized among the first device and the one or more second devices based on the first key and the second key. Further, the synchronized multimedia interactive communication is performed along with the presentation of the multimedia content.

An aspect of the invention provides a method for generating a synchronized multimedia session among a plurality of users and/or devices.

Another aspect of the invention provides an apparatus for generating a synchronized multimedia session among a plurality of users or devices in a network.

An aspect of the invention provides a method for watching a multimedia event with other users located at a different location. A user may request the other users to watch a multimedia event such as a TV program which is currently airing. In an embodiment of the invention, the user may send a request for watching a multimedia event to be telecasted in the future.

BRIEF DESCRIPTION OF THE DRAWINGS

Figure 1:
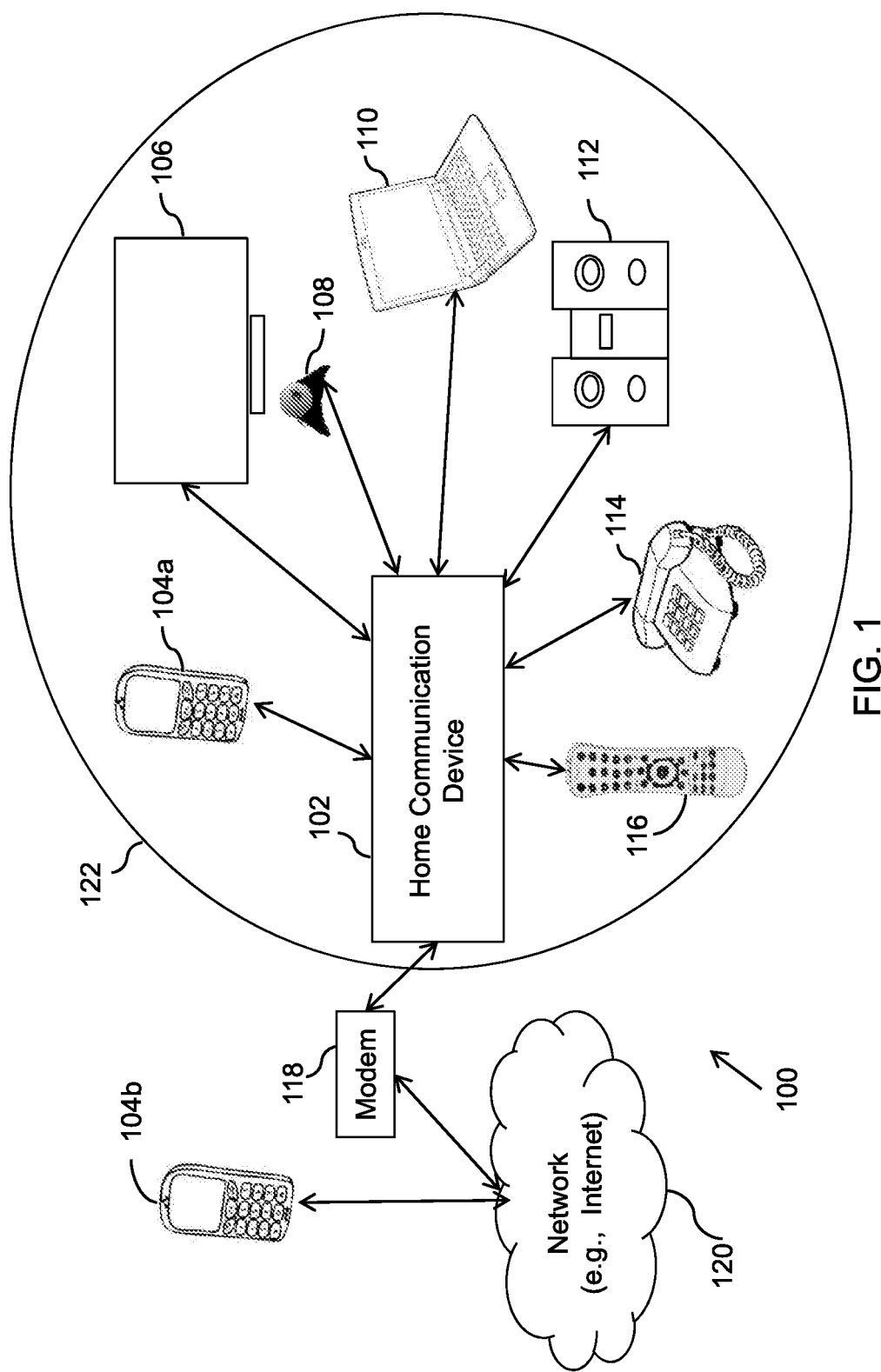
Figure 2:
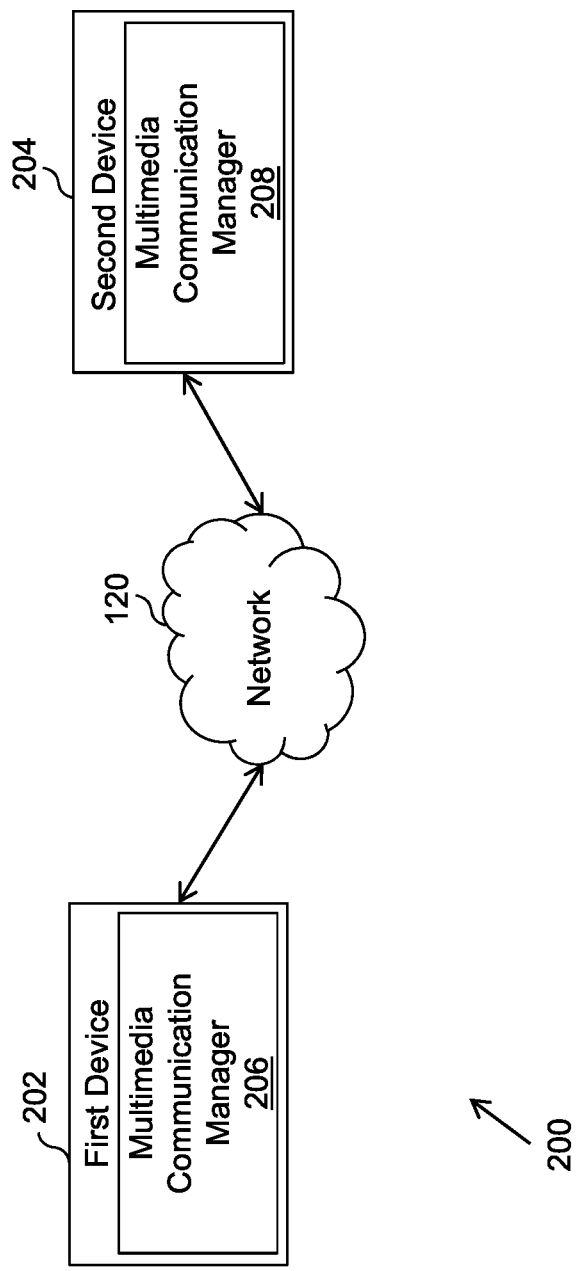
Figure 3:
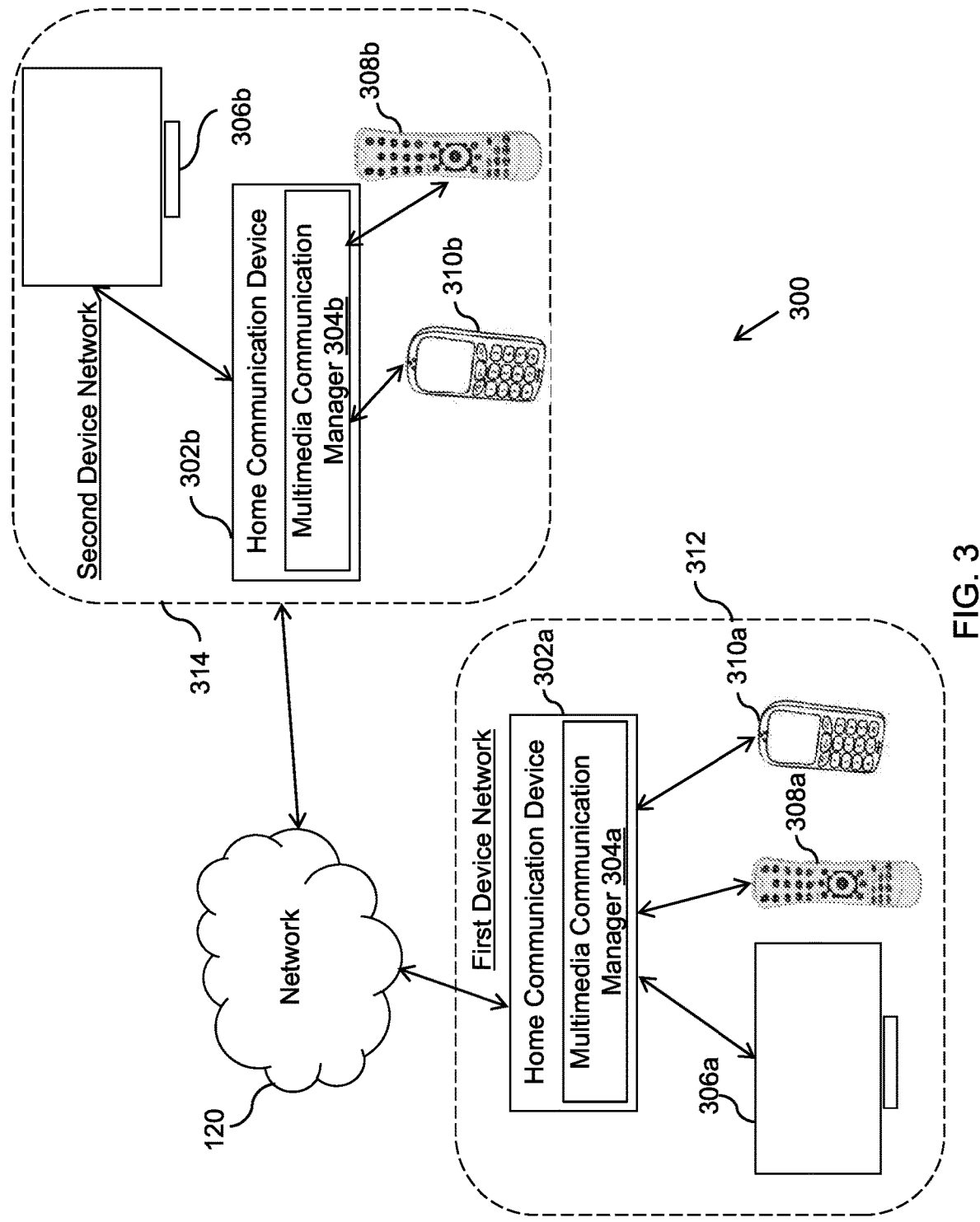
Figure 4:
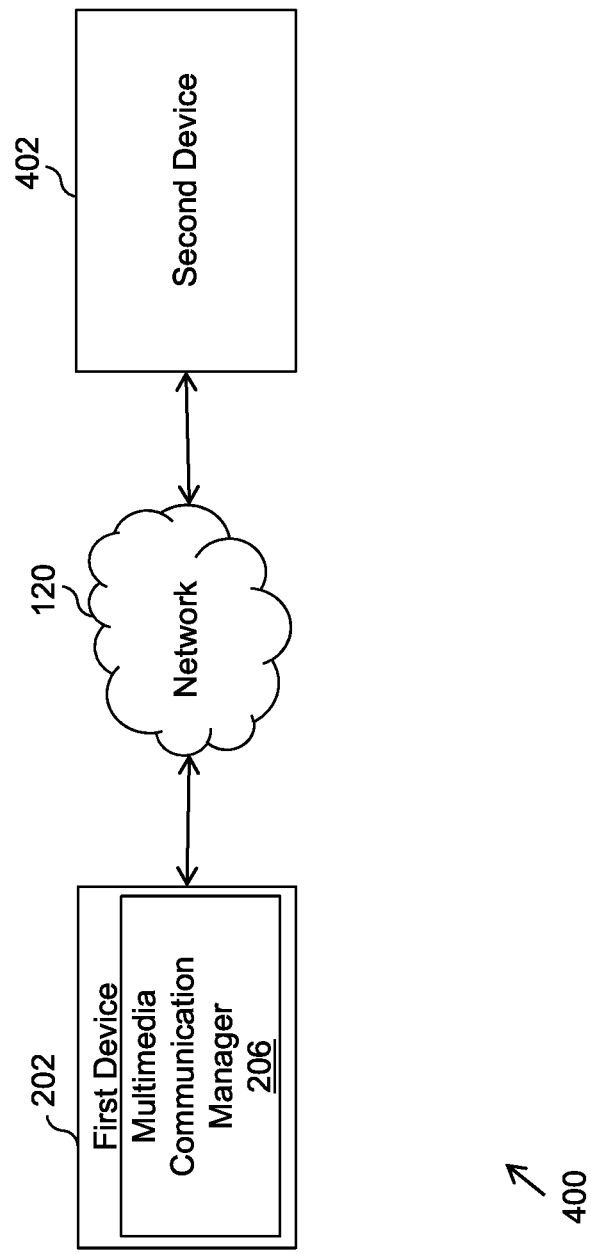
Figure 5:
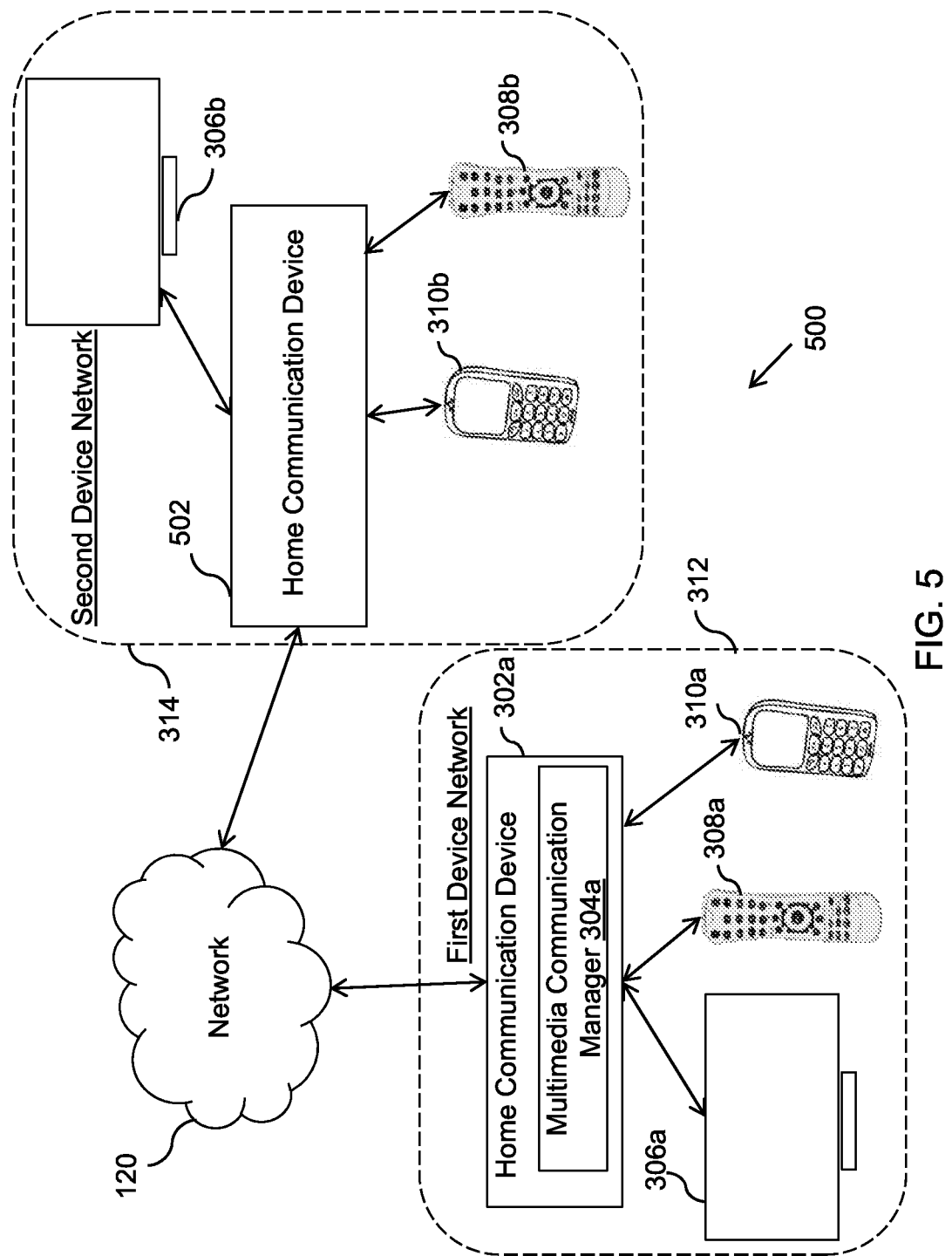
Figure 6:
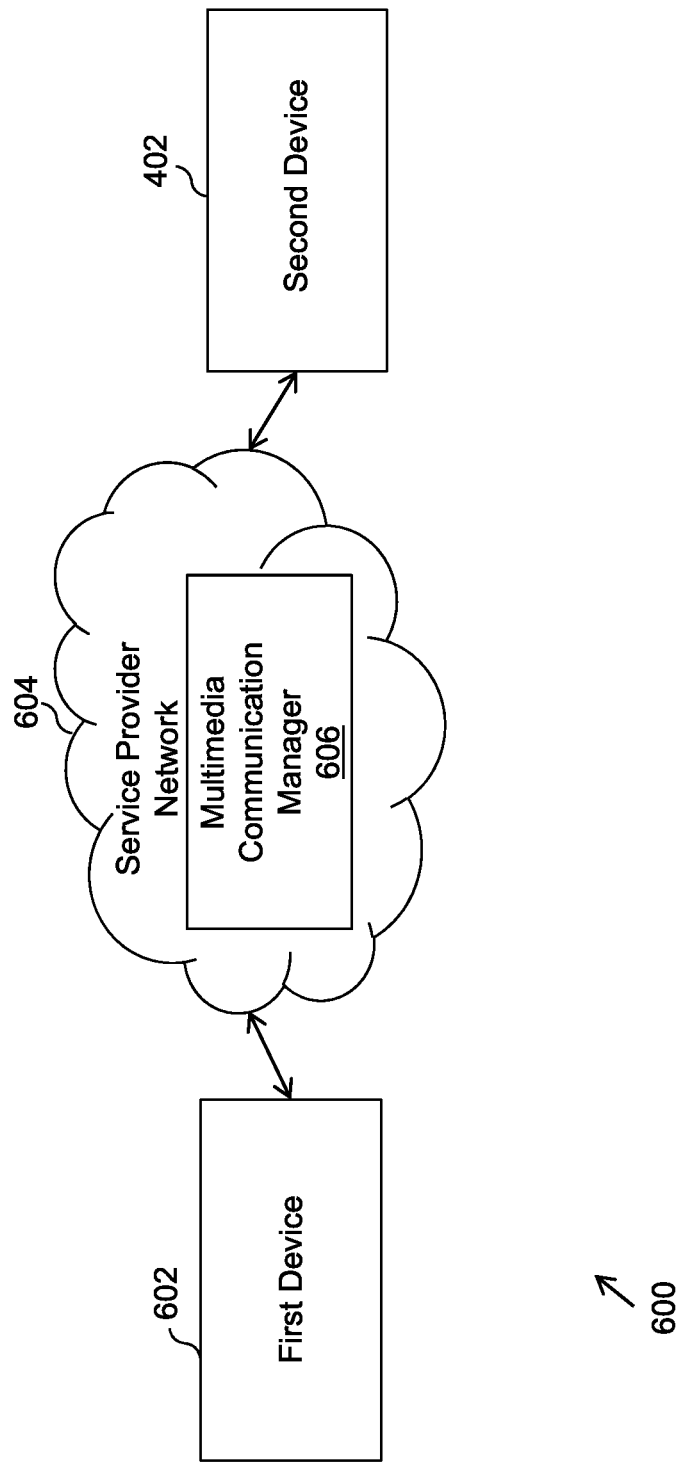
Figure 7:
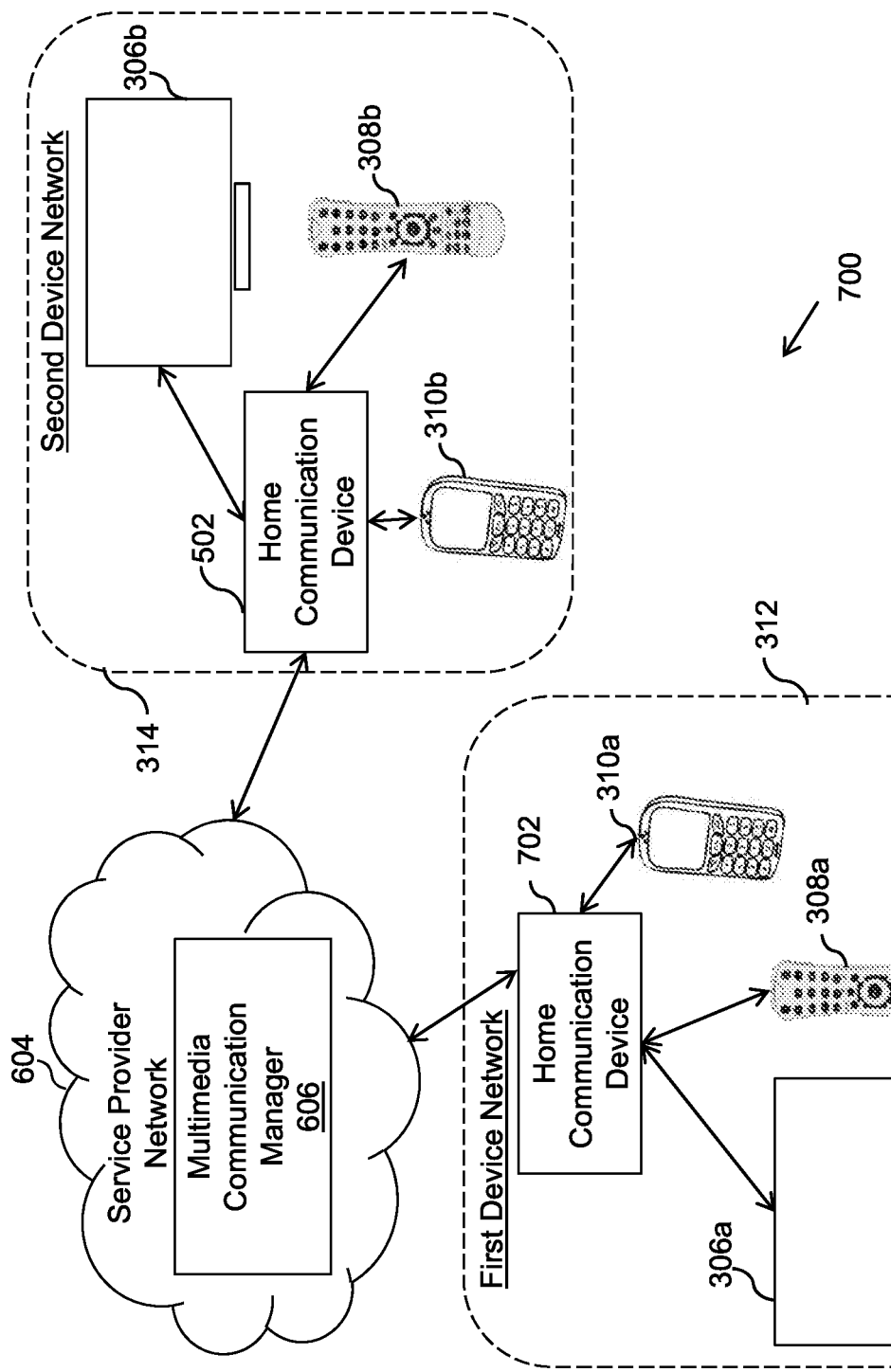
Figure 8:
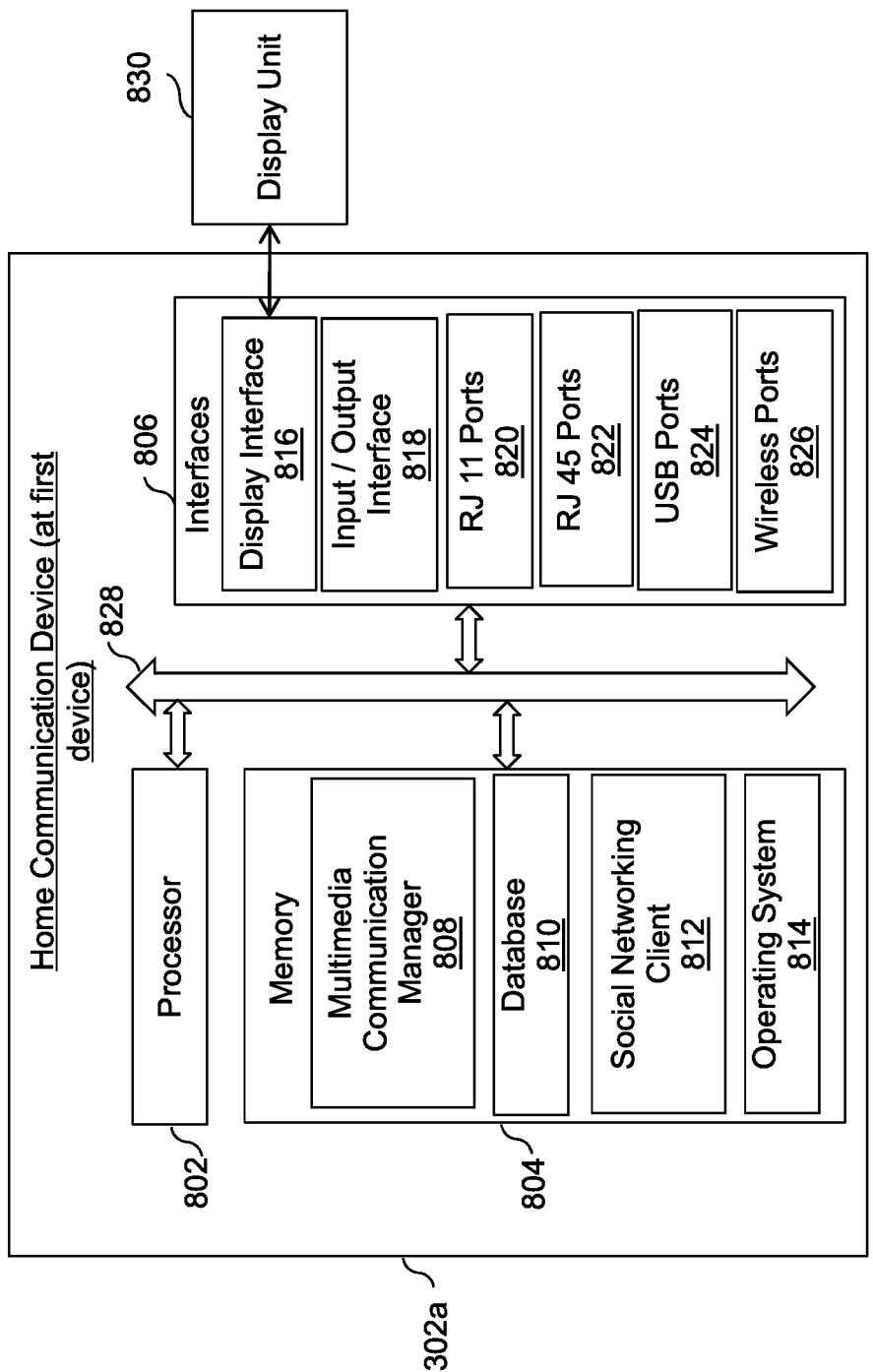
Figure 9:
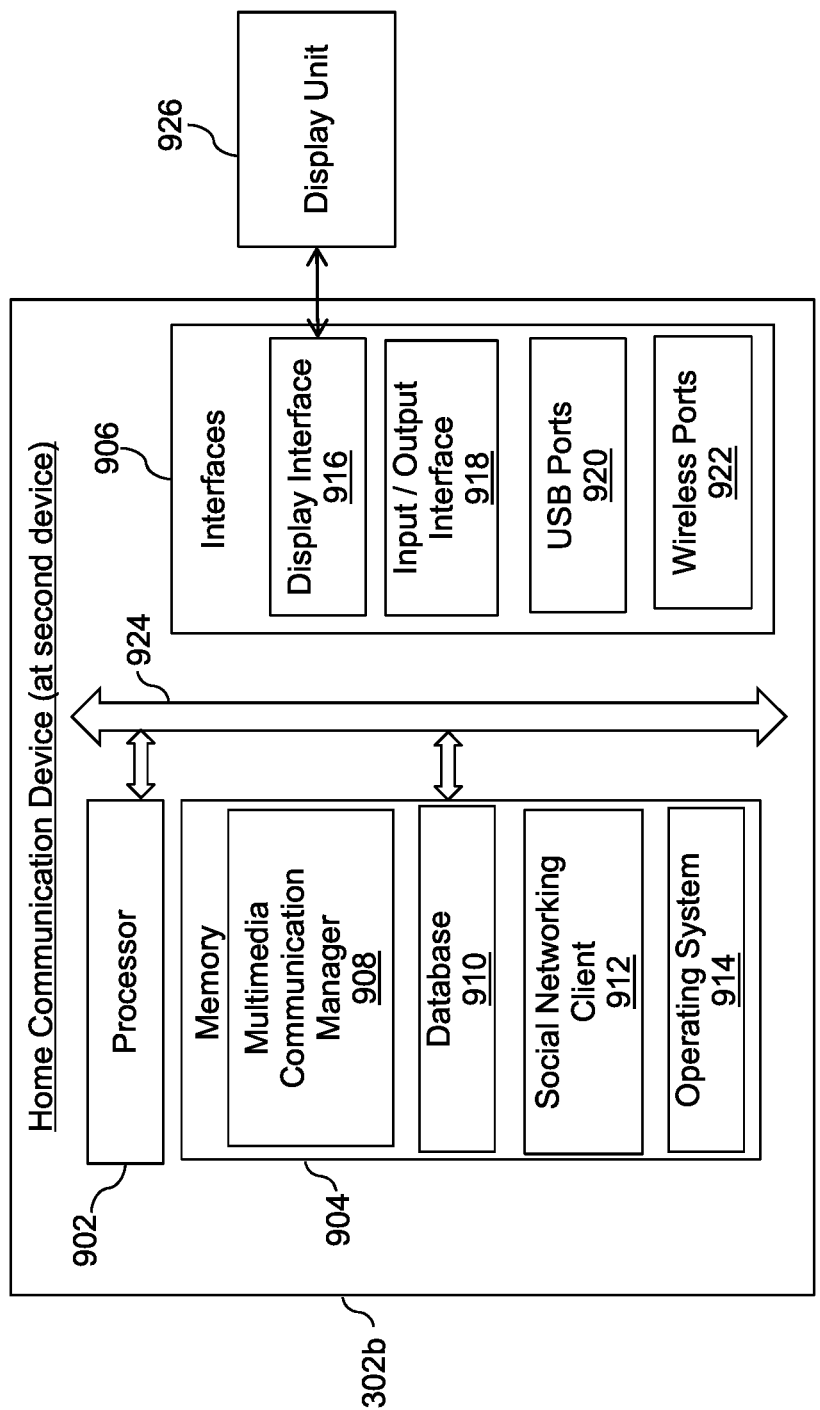
Figure 10:
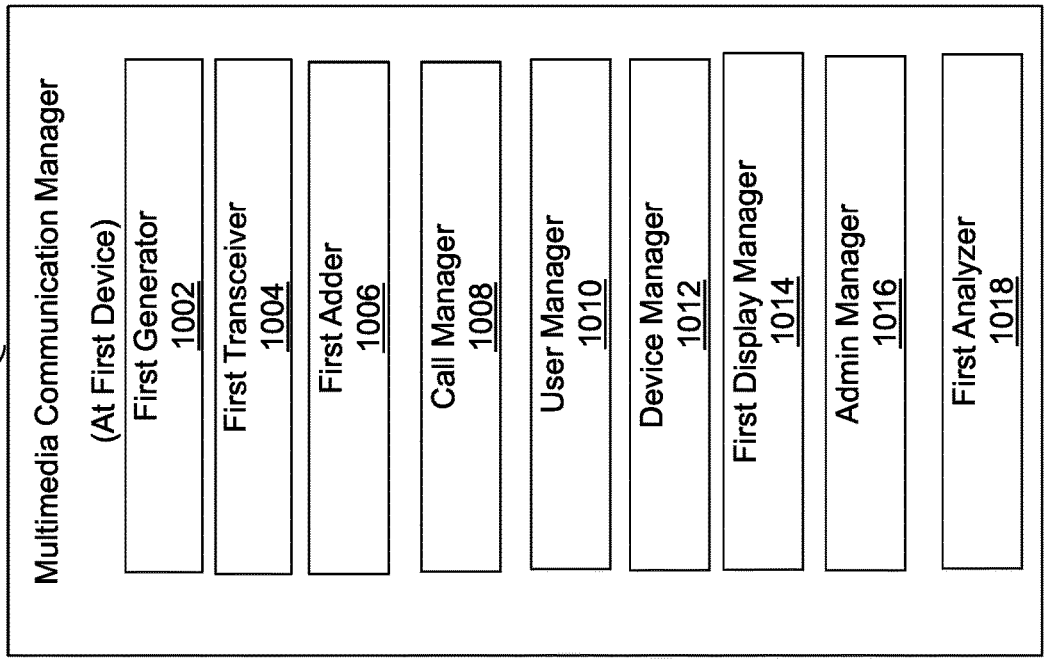
Figure 11:
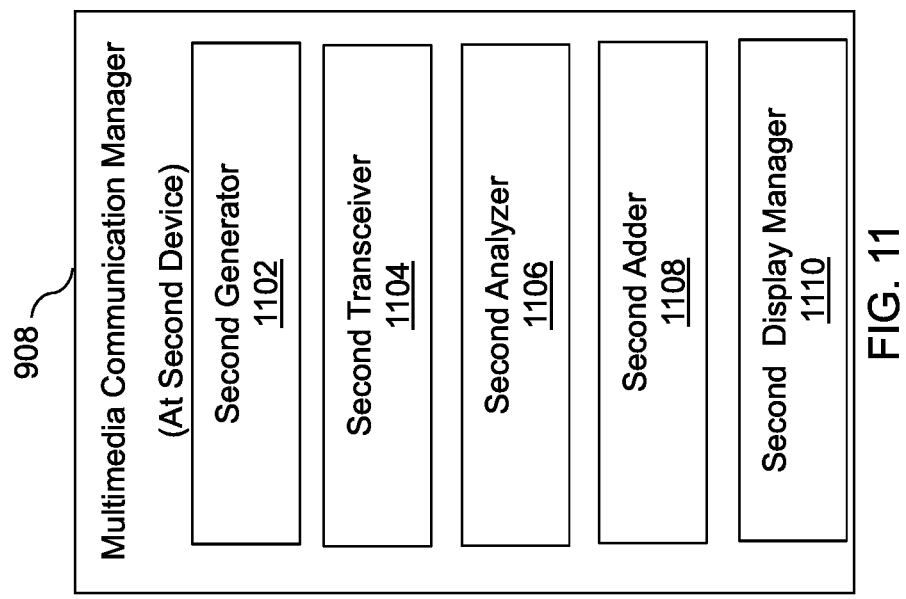
Figure 12:
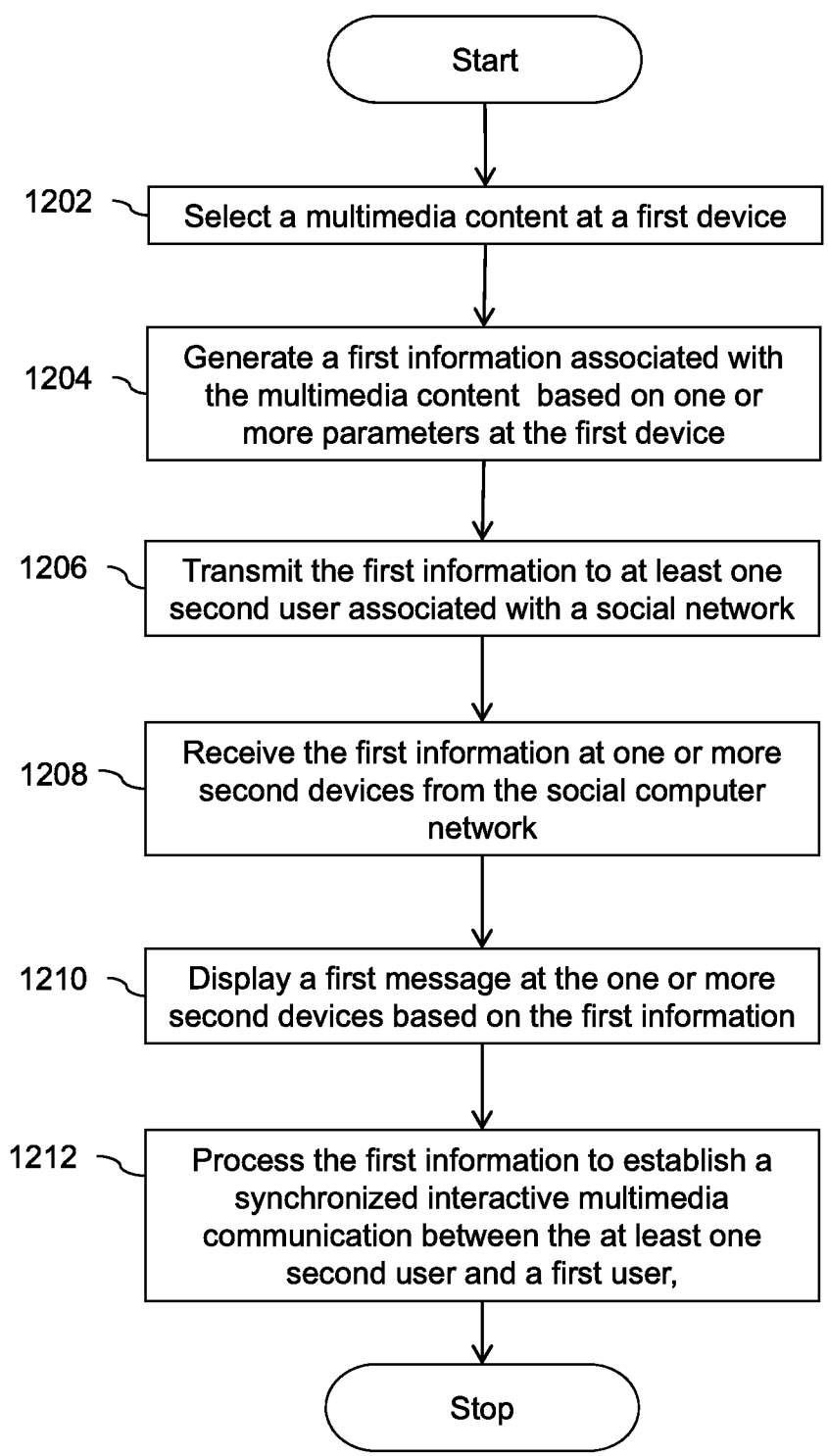
Figure 13A:
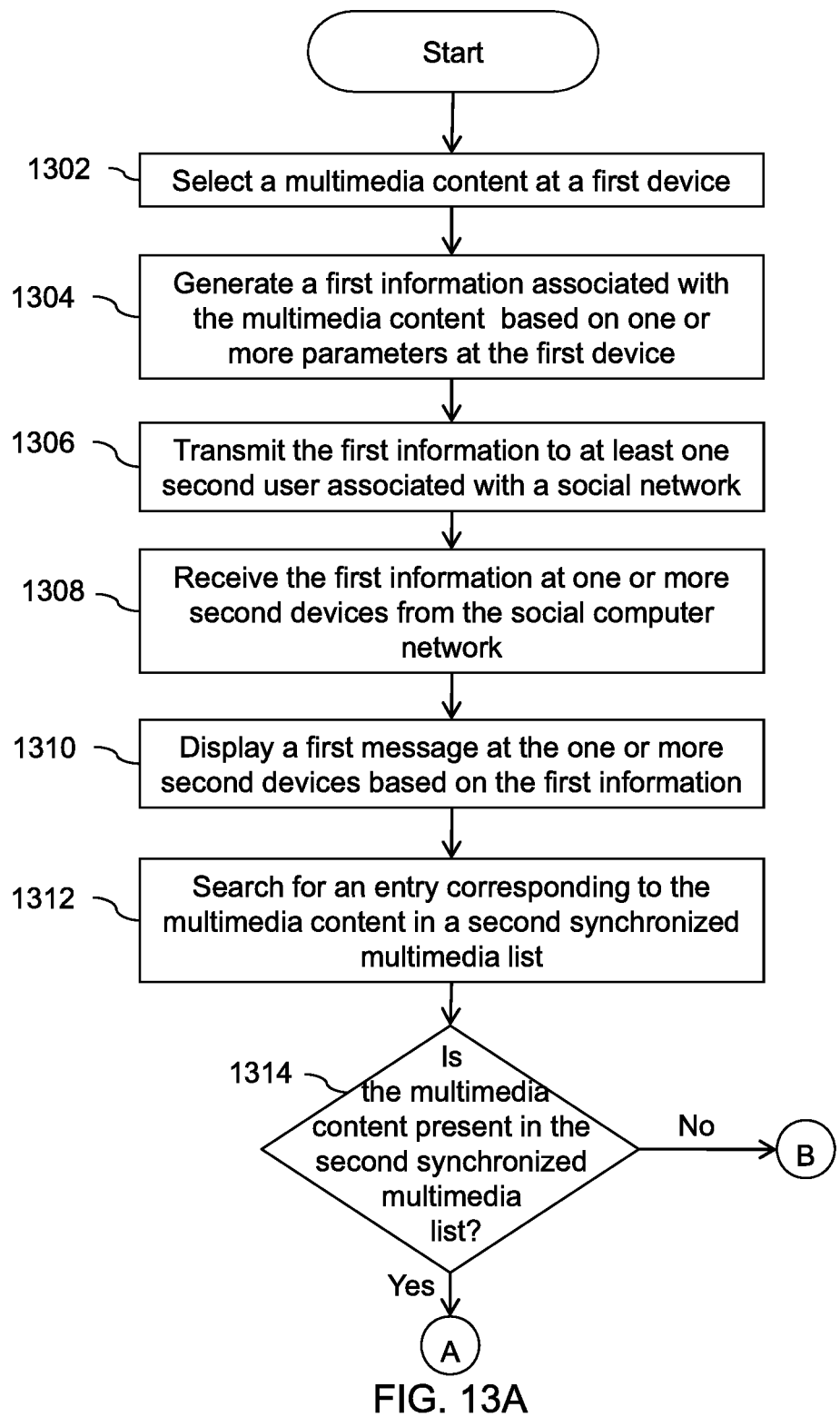
Figure 13B:
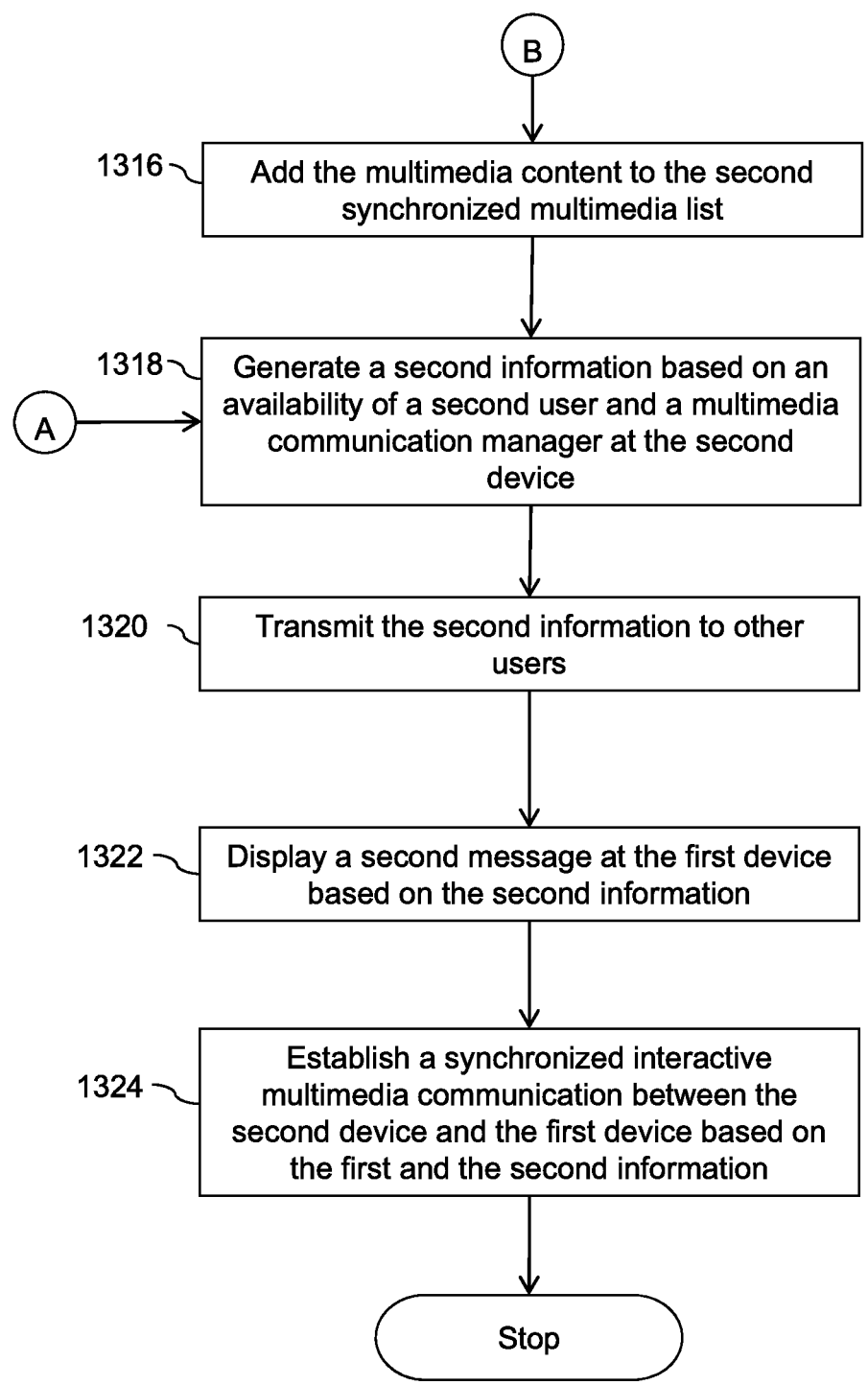
Figure 14:
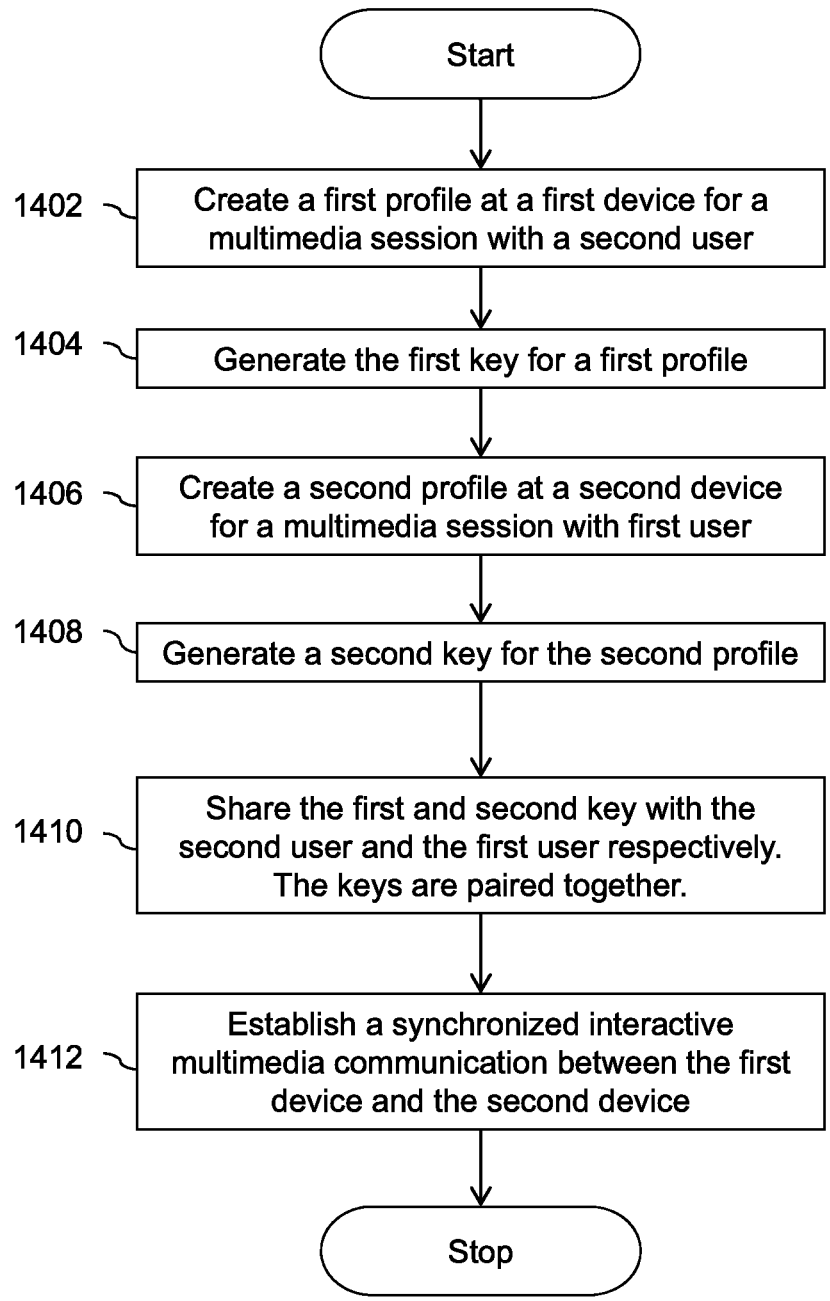

Having thus described the invention in general terms, reference will now be made to the accompanying drawings, which are not necessarily drawn to scale, and wherein:

FIG. 1 illustrates an environment where various embodiments of the invention may function, in accordance with an embodiment of the invention;

FIG. 2 illustrates an environment where a first device and a second device includes a multimedia communication manager, in accordance with an embodiment of the invention;

FIG. 3 illustrates an exemplary functioning of a home communication device including multimedia communication manager, in accordance with an embodiment of the invention;

FIG. 4 illustrates another environment when a second device does not include a multimedia communication manager and its features, in accordance with an embodiment of the invention;

FIG. 5 illustrates another environment when a home communication device associated with second device(s) does not include a multimedia communication manager and its features, in accordance with an embodiment of the invention;

FIG. 6 illustrates an cloud based environment when a service provider network provides features of a cloud based multimedia communication manager, in accordance with another embodiment of the invention;

FIG. 7 illustrates another environment when the service provider network includes a cloud based multimedia communication manager, in accordance with an embodiment of the invention;

FIG. 8 illustrates exemplary elements of the home communication device associated with the first device for managing communications, in accordance with an embodiment of the invention;

FIG. 9 illustrates exemplary elements of the home communication device associated with the second device for managing communications, in accordance with an embodiment of the invention;

FIG. 10 illustrates exemplary elements of the multimedia communication manager associated with the first device, in accordance with an embodiment of the invention;

FIG. 11 illustrates exemplary elements of the multimedia communication manager associated with the second device, in accordance with an embodiment of the invention;

FIG. 12 illustrates a flowchart for establishing a synchronized interactive multimedia communication among a plurality of users, in accordance with an embodiment of the invention;

FIG. 13A and FIG. 13B illustrate a single complete view of illustrates a flowchart for establishing a synchronized interactive multimedia communication among a plurality of devices, in accordance with an embodiment of the invention; and FIG. 14 illustrates a flowchart for establishing a synchronized interactive multimedia communication among a plurality of devices, in accordance with another embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

FIG. 1 illustrates an environment 100 where various embodiments of the present invention may function, in accordance with an embodiment of the invention. The environment 100 includes a home communication device 102 for connecting multiple devices. Further, the home communication device 102 is configured to manage communication among the multiple devices. In an embodiment of the invention, a remote control device 116 may be used to control functions of the home communication device 102. Examples of the home communication device 102 include, but are not limited to, a Digital Video Recorder (DVR), a Set-Top Box (STB), a Home Media Gateway (HMGW), a media streaming device, an Integrated Access Device (IAD), a cable convertor box, a blu-ray player, a smart television, and so forth. STB is a generic name for the interface boxes supplied by the service providers, which allow a user to get the TV content (multimedia content) from the service provider. Generally, the STB may include decoding elements that retrieves the channel packages as defined by a service license purchased by the user from the service provider. However, a typical STB may not include a persistent local storage large enough for recording Television (TV) programs. Various devices such as STBs or DVRs may provide access to Video on Demand (VoD) channels, or streaming of video contents directly from the Internet. The VoD channels may include TV programs, movies or video content, which are available for viewing independent of any specific scheduling and thus can be streamed to the user's DVR/STB when the user wants to watch it.

The digital video recorder (DVR) is a device like STB, which is also equipped with large persistent local storage, usually in the form of a local hard drive that may allow the user to record programs for later viewing. DVRs can also store video contents on a remote, cloud-based storage. The home media gateway (HMGW) may be a device that connects with the service provider's network for a variety of services as broadband Internet connectivity and Voice over Internet Protocol (VoIP) telephony services. The HMGW may also include an interface to the TV programming of the service provider, in conjunction with the functionality of the STB or DVR. A HMGW may include Telephone Jacks such as RJ11 connectors for connecting legacy analog phones (Plain Old Telephone Service (POTS)) allowing the user to connect to an existing telephony equipment. A HMGW may or may not include a built in battery that may provide emergency power for the telephony functions in case of a power disruption.

The home communication device 102 may be used to connect multiple devices of a communication network 122 with one or more devices through a network 120. The home communication device 102 may also act as an interface to connect the multiple devices in the computer network 122 with the network 120. Examples of the network 120 include, but are not limited to the Internet, high bandwidth computer network, a cable TV infrastructure, a satellite infrastructure such as a Direct-Broadcast Satellite (DBS) and so forth. Further, examples of the computer network 122 include, but not limited to, a Local Area Network (LAN), a wireless network, a mobile network, a Personal Area Network (PAN) such as Bluetooth, Infrared, and so forth.

In an embodiment of the invention, the home communication device 102 may be connected to a broadband modem. The broadband modem may be configured to encode and decode the signals transmitted to and received from the network 120. Further, the broadband modem may modulate an analog carrier signal received from the home communication device 102 to encode digital information, and can also demodulate such a carrier signal to decode the transmitted information. Further, the broadband modem produces a signal that can be transmitted easily and decoded to reproduce the original digital data. In another embodiment of the invention, the home communication device 102 may include broadband modem, a router, a switch or other similar network communication management device and/or functionality.

A first device can be a device capable of communicating or transmitting signals or information/message to other devices. The home communication device 102 may connect or communicate with multiple first devices such as a mobile phone 104a, a television 106, a web camera 108, a laptop computer 110, a music player or home theatre system 112, a telephone 114, a personal digital assistant (PDA), a computer, a smart phone, a net-book, a tablet computer, and so forth. Further, the connection between the home communication device 102 and the multiple devices can be wired or wireless. The wired connection may be established by using a universal serial bus (USB) cable, a wire, and so forth. The wireless connection may be established via radio communication, infrared communication, microwave communication, Wi-Fi, Bluetooth, and so forth.

The multiple first devices can communicate with the second devices via voice communication, data communication or video communication. Further, each of the multiple devices may be used by first users. The first users at the multiple devices can share or exchange multimedia content with second users associated with the second devices. The multimedia content may be a combination of one or more media content such as but not limited to, video, audio, photo, text, and so forth. The network 120 may be connected to the multiple second devices such as a mobile phone 104b associated with a second user that can communicate with the home communication device 102 or the plurality of the first devices. Moreover, they can communicate with the multiple devices connected to the computer network 122 or with other second devices also. Further, the multiple devices can communicate among each other directly or through the home communication device 102. Examples of the second devices and the multiple devices include, but are not limited to, telephones, computers, laptops, tablet computers, mobile phones, televisions, home theatre systems, gaming consoles, and so forth. Moreover, the home communication device 102 may support various communication protocols such as Voice Over Internet Protocol (VOIP) such as Session Initiation Protocol (SIP), Media Gateway Control Protocol (MGCP) and H.323, radio telecommunication, and so forth. Although, a single second device is shown in FIG. 1, a person skilled in the art will appreciate that multiple devices may be connected to network 120.

In an embodiment of the invention, the home communication device 102 may manage the communication among the first and second devices based on predefined preference. The predefined preferences include rules that can be configured by a user of home communications device 102 to manage calls. Therefore, for instance, when a call is received at home communication device 102 from a second device by using VOIP, then the call may be forwarded or routed to a first device such as an ordinary telephone 114 based on the predefined preferences available at the home communications device 102. In this case, the home communications device 102 may format the VOIP communication to support the analog communication of the ordinary telephone or can use another device such as an Analog Telephone Adaptor (ATA/IAD) to communicate with ordinary analog phone(s) and vice versa.

Another embodiment of the invention may include video along with the voice channel of the call, creating a video conferencing between the second and first communications devices. In this case, the end device would be a TV (or a smart TV), a laptop, a tablet PC, a PDA or a smart phone.

Further, the first users and the second users may be connected to a social computer network associated with a social computer networking website. Examples of the social computer networking web site include, but are not limited to, Facebook, Myspace, Twitter, Badoo, Bigadda, Bebo, AsianAvenue, BlackPlanets, Buzznet, CafeMom, Cake Financial, Blauk, Athlinks, Cloob, Classmates.com, Delicious, Dol2day, Douban, Elftown, Faceparty, Fetlife, FledgeWing, Flickr, FourSquare, Friend Reunited, Linkedin, Flixster, Gogoyoko, Google Buzz, and so forth. In an embodiment of the invention, the multiple devices and/or the home communication device 102 may include a social computer networking client for communicating with one or more users or an application in a social computer network. The social computer networking client may be an application associated with a social computer networking web site on client side. In another embodiment of the invention, the second devices may also include a social computer networking client associated with the social computer networking web sites.

FIG. 2 illustrates an environment 200 where a first device 202 and a second device include a multimedia communication manager, in accordance with an embodiment of the invention. The environment 200 may include the first device 202 that may be connected to the network 120. Further, a second device 204 may be connected to the first device 202 through the network 120. The first device 202 and the second device 204 may communicate with each other by transmitting and receiving one or more signals or messages of information. The first device 202 may include a multimedia communication manager 206 for generating a synchronized multimedia session or synchronized interactive multimedia communication with the second device 204. In an embodiment of the invention, the first device 202 can act as the home communication device as explained in FIG. 3. Examples of the first device 202 and the second device 204 include, but not limited to, a mobile phone, a PDA, a laptop computer, a tablet computer, a net-book, a smart phone, a computer, an STB, a DVR, a HMGW, a smart TV, and so forth. The first device 202 can transmit or receive multimedia content to and from the second device 204 via the network 120. Examples of the multimedia content include, but are not limited to, audio, video, text, or combinations of these. A first user or user A may use the first device 202 to initiate a multimedia session with the second device 202. Although not shown, but a person skilled in art will appreciate that the first device 202 may initiate multimedia session with more than one second device 202. Similarly, a second user at the second device 202 may initiate multimedia communication with the first device 202 or multiple devices.

In an embodiment of the invention, the first device 202 is configured to generate first information associated with a multimedia content selected by the first user by using the first device 202. Examples of the multimedia content include, but not limited to, a music concert program, a TV serial, a sports event, a music video, a game, and so forth. The information is generated based on one or more parameters. Examples of the parameters include, but are not limited to, an internet protocol (IP) address associated with the first device 202, details associated with the multimedia communication manager 206, time schedule associated with the multimedia content, a first Uniform Resource Locator (URL) associated with the multimedia content, service information wherein the service information may include a second URL associated with a third device, and so forth. The third device can be for example, a server or a service provider device. The first device 202 may also be configured to transmit the first information to at least one second user. The second users and the first user (s) are associated with a social computer network such as Facebook, Twitter, and so forth.

The second device 204 may be configured to receive the first information from the social computer network. The first user associated with the first device 202 and the second user at the second device 202 may be interconnected via the social computer network. For example, the first user and the second user may be part of a virtual community or social computer network via asocial computer networking web site such as 'Rock Music' on Facebook or the first user and the second user are friends to each other on Twitter. The second device may also be configured to process the first information to generate a synchronized multimedia session with at least one of the at least one second user and the first user. The presentation of the multimedia content in the synchronized multimedia session is synchronized among the first device(s) and the second devices.

In an embodiment of the invention, the second device 204 may also include a multimedia communication manager 208 for generating and establishing synchronized multimedia session with the first device 202. In an embodiment of the invention, the second device 202 is also configured to establish multimedia communication with other devices such as other mobile phones, laptop, computer, PDAs, smart phones, and so forth. The second device 204 is also capable of sending or receiving one or more messages or information to and from the first device 202. Further, the second device 204 can share one or more information with the first device 202. In an embodiment of the invention, the second user at the second device may initiate a synchronized interactive multimedia communication with the first user.

The multimedia communication manager 206 can be local to the device 202 or it can run as a cloud based service available to the device 202. In both cases its functionality is exactly the same. Similarly, the multimedia communication manager 208 can be local to the device 204 or it can run as a cloud based service available to the device 204.

In an embodiment of the invention, the first user can initiate a synchronized multimedia session or synchronized interactive multimedia communication with the second device 204 (or second devices) while watching multimedia content such as a TV program on the first device 202. For example, if the first user is currently watching a football match on a TV and wants to watch it with one or more friends or other users, then by pressing one or more keys on a remote control device attached to the TV the first user can initiate a synchronized watching session. In an embodiment of the invention, the remote control device may be associated with the home communication device as described in FIG. 3. Therefore, the first user can initiate a synchronized session to watch a TV program with the second user or one or more second users (or the second user).

In an exemplary scenario, a user A at the first device 202 such as a TV or a home communication device 102 and a user B associated with at least one second device such as the second device 204, can generate and establish a synchronized multimedia session for a currently running multimedia content or TV program. The first device 202 may include an associated remote control device that can be used to access one or more features of the first device 202. In an embodiment of the invention, the remote control device may be associated with the home communication device, which can be used by the user B to access the respond to the messages received from the first user. The remote control device may include one or more exclusive keys for accessing one or more features of the multimedia communication manager 206 associated with the first device 202.

In an embodiment of the invention, multimedia communication manager 304a may be present in a home communication device 302a. In such a scenario, a remote control device 308a or 308b may be associated with the home communication device 302a or 302b as shown in FIG. 3. Typically, the user A and the user B are connected via a social computer network such as a Twitter network, a Facebook network, and so forth. In an embodiment, of the invention, the user A and the user B are located in different parts of town or world. Both follow each other's Twitter messages.

In an exemplary scenario, the user A may be viewing a TV program, and may wants to watch it in the company of his friends or the second users. Therefore, the user A may click one or more exclusive keys or key combinations on the remote control device associated with the TV i.e. the first device 202. In an embodiment of the invention, the user A may click one or more exclusive keys or key combinations on the remote control device 308a associated with the home communication device 302a (or the first device). In an embodiment of the invention, the remote control device of the first device 202 may include one or more keys exclusively for accessing one or more features or functions of the multimedia communication manager 206. Similarly, a remote control device associated with the second device 204 or the home communication device 302b may include one or more exclusive keys for accessing one or more features or functions of a multimedia communication manager 208 or 304b respectively. Therefore, when the user A presses one or more exclusive keys at the remote control device of the home, the multimedia communication manager 206 may perform various operations. The multimedia communication manager 206 may transmit one or more messages (or first message) such as a Twitter message to all his Twitter followers (to the second users or the user B) that may include the interest of the user A to watch the given TV program, with the program's details and with the URL information. Further, the user A may select a TV program from a program guide associated with a service provider of the first device. The format of messages exchanged between the first device 202 and the second device 204 may be compatible with the TV service provider's Graphical User Interface (GUI). In an exemplary scenario, the format of the message can be, "Would you like to watch <the TV program name from the service provider's program guide> with me?<Short URL>". A person skilled in the art will appreciate that the format of the message may differ depending on various hardware and software implementation of the multimedia communication manager at various devices. In an embodiment of the invention, the user A may insert customized information in the message or may customize the complete message. For example, the user A may insert a text describing the importance, a reason for preference of the program, or any other custom text or multimedia information.

Thereafter, the multimedia communication manager 206 adds the TV program to a first synchronized multimedia list on the first device 202. The first synchronized multimedia list may include, but not limited to, the selected TV program, candidate TV programs, and so forth. Thereafter, first information associated with the TV program selected by the user A is generated by the multimedia communication manager 206. In an exemplary scenario a first device may be connected to the home communication device 302a. In such a scenario, the multimedia communication manager 304a may add the TV program or the multimedia content to the first synchronized multimedia list associated with the first device. The first information may include information such as, but not limited to, an IP address of the first device, information about the user A, details about the TV program to be watched, information about the second device or the user B, and so forth. In an embodiment of the invention, the information about the user A may be limited so as not to compromise user's privacy setup. A person skilled in the art will appreciate that the first information may also include other details such as a second URL associated with a third device such as a server or service provider, details associated with the multimedia communication managers 206 and 208, duration of the TV program, time schedule such as date and time of TV program, and so forth. According to an embodiment of the invention as described in FIG. 3 later, the first information may include information about the multimedia communication managers 302a and 302b. Thereafter, the first information is transmitted to the user B or the multiple second users in the social computer network.

The multimedia communication manager 206 may include a social computer networking client such as a Twitter client which gets Twitter messages from the users connected to on the social computer network. When the first message is received by one of user A's followers or friends (such as the user B) or at the second device 204, the multimedia communication manager 208 may displays a semi transparent pop up message on the TV screen of each of the user A followers (to whom message was sent) for a few seconds, after which it fades away. A person skilled in the art will appreciate, that the message can be displayed in other form also such as a text message, an audio message, a video message, and combination of these, and so forth. The multimedia communication manager 208 may add the program indicated in the received first message in a second synchronized multimedia list such as 'Second Social TV Watching program list' at the second devices or the second device 204. The second synchronized multimedia list may include selected TV program, candidate TV programs, and so forth. The second social TV watching list can be accessed from the remote control associated with the second device 204. In an embodiment of the invention, the TV program is not being recorded. The incoming joining request or the first message or the first information at the second device 204 may be indicated by blinking a light, sounding an alarm, a visual reminder on the second device 204. For example, the light may be a Light Emitting Diode (LED) that may blink to indicate the request. The incoming joining request may be an invitation to watch the selected TV program with the user A. The blinking pattern will inform or indicate to the second user or the user B about a new multimedia event. The multimedia communication manager 208 will keep this blinking pattern until the program is over, or until the user B accepts the invitation and joins the synchronized multimedia session for this TV program, or decides to reject it. At that time the program info is removed from the 'Second Social TV Watching list' (i.e. the second synchronized multimedia list).

In an exemplary scenario, when the user B is currently in front of his TV, watching some program and gets the first information or Twitter message from the user A as a semi transparent popup message on screen of the second device 202. During the time of the popup message the user B can pick up the remote control device associated with the second device 204 and may indicate that he/she wants to watch that TV program together with the user A by pressing at least one exclusive key at the remote control device such as 'Socialize key' on the remote control device of the second device. When the user B presses the 'Socialize Key' the multimedia communication manager 304b associated with the home communication device 302b as shown may transmit or multicast a second message such as a second Twitter message of the form: "Would you like to watch <the TV program name from the service provider's program guide> with me? <Short URL>" to the first device(s) and/or second devices. The name of the program may be the same name which was indicated in the user A's first message, regardless of the program that the user B is currently viewing. The multimedia communication manager 208 may add the TV program indicated in the received first message in the second synchronized multimedia list such as the 'Social TV Watching list' associated with the second device. In an embodiment of the invention, the Social TV Watching list can be accessed by pressing one or more exclusive keys at the remote control device of the second device 204 (or the home communication device 302b). In an embodiment of the invention, the multimedia communication manager 304b may be present on the home communication device 302b (as shown in FIG. 3) or it can be accessed as a web based service on the cloud i.e. by a service provider network 604. Further, the multimedia communication manager 208 may display an exclusive second menu (e.g. a social TV menu) when the user B selects the one or more exclusive keys. The second synchronized multimedia list may be accessed by choosing one or more options of the second exclusive menu. Further, the TV program is not being recorded.

In an embodiment of the invention, the first device may not include a multimedia communication manager as shown in FIG. 3 and is connected to the home communication device 302a. In such a case, the multimedia communication manager 304a of the home communication device 302a may perform all the functions of the multimedia communication manager 206 as described above.

In an embodiment of the invention, the user B may broadcast or transmit the second message to all his followers or friends including the user A, but not limited to the user A alone. In an embodiment of the invention, the user A may decide to watch this program with another user or a user D and not necessarily with the user B. In an embodiment of the invention, the user B might get a confirmation or a third message from the user A or a response from another user who would like to watch this program. The overall effect is a ripple broadcast effect of invitation messages for this specific TV program or multimedia content which first user wants to watch with other second user(s).

In an embodiment of the invention, the user B or the one or more second users may receive the first message at their mobile devices such as a mobile phone. The first message may be received as a multimedia message (MMS), an SMS, an audio message, or a video message, or a combination of these. In an embodiment of the invention, the user B or the one or more second users are subscribers to a service provider associated with the multimedia communication manager 208 features, then they can use the multimedia communication manager 208 mobile application which runs on their mobile device to respond as well as schedule a new synchronized multimedia session for another TV program or multimedia content. In an embodiment of the invention, the first message transmitted by the user A may be received by each of the user A's followers or friends or second users of the user A's social computer network also on their mobile devices. The mobile phone may include a social computer networking client such as a cell-phone Twitter client. Each of the user A's friends or followers on his/her social computer network can see the TV program information indicating what user A is watching. In an exemplary scenario, in case the followers of the user i.e. the user B wants to watch the program together with user A, then various operations may be performed. The user B may access or go to an exclusive multimedia menu by pressing one or more exclusive keys on a keypad of the mobile device. The user B then may select the second first synchronized multimedia list; the second synchronized multimedia list may include one or more candidate TV programs. Further, the TV program which is currently on air and for which the request has been received from the user A is indicated in a different color (or highlighted in some other fashion) than other TV program for future scheduled watching. The user B may select the at least one highlighted program. Additionally, a list of friends/family members or users who wants to watch it may be presented to the user B. The user B may select the one or more users with whom he wants to watch it. When selected, the multimedia communication manager 208 may transmit the second message or a second Twitter message of the form: "Would you like to watch <the TV program name from the service provider's program guide> with me? <Short URL>". In an embodiment of the invention, the above mentioned steps do not initiate the bidirectional synchronized multimedia session yet, since it may require a three way handshake.

In an embodiment of the invention, the second device may not include the multimedia communication manager and may be connected to the network 120 via the home communication device 302b. In such an exemplary scenario, the functions of the multimedia communication manager 208 may be performed by the multimedia communication manager 304b of the home communication device 302b.

In an exemplary scenario, the user B may receive the first message or the first Twitter message on a mobile Smartphone. Further, the user B may be near the second device before the TV program is over. In this case, the user B may use multimedia communication manager 208 application from the mobile phone to respond to the invitation request received from the user A. Subsequently, the response or the second message as described above may be sent from the user B to the user A. In an embodiment of the invention, the second message may not be broadcasted to the followers or users connected to the user B through the social computer networking websites. In another embodiment of the invention, the second message may be broadcasted to the followers or users connected to the user B through the social computer networking. The response or the second message may generate a semi-transparent popup message on the TV screen of the user A indicating that user B would like to watch it with him, but will be delayed. After a few seconds the message fades away. In an embodiment of the invention, user B's name is added to a first viewers list to that specific TV program on a first menu of the multimedia communication manager 206 at the first device 202. However, the user B's name is in a different color such as a red color indicating a delay (the delay can also be indicated in other fashions appropriate to the particular GUI). In an embodiment of the invention, the names of the users which will join the synchronized multimedia session after some delay time can be displayed by using a red color and who can join immediately can be shown by using a green color. In an embodiment of the invention, the user A may not be allowed to select a name highlighted in different color such as the red colored name from the first viewers list until it becomes green indicating that the user can join the session now.

In an embodiment of the invention, if the user A and the one or more second users are not subscribed to the multimedia communication manager features, or not subscribed to a service provider's plan associated with the multimedia communication manager 208, they can follow a second URL associated with a third device embedded in the service information in the first message. The third device may be a mobile phone, a PC, a laptop, a tablet or similar devices. In an embodiment of the invention, the third device may be a server or a service provider's network. When the user clicks or selects the second URL, the user B may be directed to a web site or a web server that offers him a way to change or upgrade his subscription services. The web site can reside on a server or on the service provider's backend servers. For example, web site is hosted on user A's service provider's backend server. When the user B clicks on the second URL the user B's name may be looked-up at the customer database of the user A's service provider. In an embodiment of the invention, if the user B is a subscriber but does not yet have the multimedia communication manager feature set then he may request for the updated feature set. For example, a different service package or an add-on service package may be offered to the user B. If accepted the new features are remotely downloaded to user B's home communication device 208 and installed such that he can start using and participating in the multimedia or Social TV events.

In another embodiment of the invention, if the user B is not a subscriber of user A's service provider then he might be offered with a customized service package according to his requirement for moving from his current provider to the user A's service provider. For example: getting the social TV features for free for a certain number of months. If the user B accepts this promotion it is considered as a customer acquisition transaction which resulted from social TV. In an embodiment of the invention, the multimedia communication manager features may be federated by different service providers, but the service providers must own license to this technology.

In another embodiment of the invention, the user A may receive the second message or (second messages) such as second Twitter message(s) which invites him to view a TV program with a remote friend/family member from the user B or the one or more second users. The format of the second message may be such as, but not limited to, "Would you like to watch <the TV program name from the service provider's program guide> with me?<Short URL>". After receiving the second message, the multimedia communication manager 206 of the first device 202 may generate a semi transparent popup message on the TV screen (i.e. the first device 202) indicating that the user B would like to watch it with him. In an embodiment of the invention, the users may be indicated about an incoming message by blinking a light, sounding an alarm, a visual reminder on the first device 204 (or the home communication device 302a). The second message may fade away after few seconds. When the second message is a reply to the first message (or a previously sent invitation from the user A) which the user A sent with the same TV program name it means that this TV program already has an entry in the first synchronized list on his first device or DVR. Also, the name of the sender (the user B in this example) is added to the first viewers list at the first device 202. In an embodiment of the invention, the first viewers list, the first synchronized multimedia list, and so forth may be managed by the home communication device 302a. The first viewers list may include members who would like to watch the TV program with the user A. In this case, if the user A presses the at least one exclusive key on the remote control device of the first device 202 during the brief time the semi transparent message is displayed the multimedia communication manager 206 may initiate a synchronized multimedia session with that responder (i.e. the user B).

In an embodiment of the invention, the second message received may not be a reply for the first message or to an invitation the user A sent earlier, it means user A's friend/family member (or a connection from the user A's social computer network) are inviting him to watch another program with them. In that case the new program mentioned in the second message may be added to the first synchronized multimedia list on the first device 202 and the user A may respond accordingly. Further, the multimedia communication manager 206 may indicate a new message by blinking a light, sound or so forth on the first device 202. In an embodiment of the invention, when the home communication device 302a includes the multimedia communication manager 304a then the new message is indicated by blinking a light such as LED or sounding an alarm on a front panel of the home communication device 302a. This blinking pattern may remain until the program is over, or the user B joins the synchronized multimedia session for this TV program. The program information is removed from the first synchronized list at the end of the program airing time, or the user B joins the synchronized multimedia session for this TV program or the user B decides to manually delete it.

According to another embodiment of the invention, the user A can also initiate the synchronized multimedia session by going to a first exclusive menu on the first device 202 by selecting one or more exclusive keys on remote control device associated with the first device 202 or a key pad of the first device 202. (or on a remote control device 308a when the home communication device 302a includes the multimedia communication manager). And selecting the first synchronized multimedia list including TV candidate programs. Each candidate TV program which is currently airing is indicated in a dedicated color (or in some other fashion), different from other TV program for future scheduled watching. The user A may select a TV candidate program. The first viewers list including potential users or second users such as the user B who wants to watch it is displayed to the user A when he/she selects the one or more exclusive keys. The user A then can select a user(s) from the first viewers list with whom the user A would like to watch the selected program. A person skilled in the art will appreciate that the steps mentioned above and the method according to the invention is not limited to one on one watching and may allow multiple users interaction. When the user A has selected a user from the first viewer's list it initiates the bidirectional synchronized multimedia session, opens a small picture in picture window on the TV screen where video conferencing with the remote party takes place, with the video conferencing audio superimposed on the audio of the TV program. The location of the video conferencing window and mixed volume level can be configured. The multimedia communication managers automatically compensate for any delays in the TV program video which might exist due to the differences in transmission paths or transmission sources.

In an embodiment of the invention, the control of the multimedia content at both the ends i.e. the first device 202 and the second device 204 (or the home communication devices 302a and 302b) are synchronized, enabling each side to be able to pause, Fast Forward or Rewind, or skip back a few seconds for an instant replay of the TV program. Another synchronized control is the ability to change the channel in case they are not happy with the ongoing program and decide to change to a different channel. In an embodiment of the invention, each side can terminate the session at any time. In an embodiment of the invention, a three way handshake process for generating and establishing the multimedia session may take place. The user who initiated the invitation (i.e. the user A) is the one who selects with whom from the list of responders he would like to watch, and the user A is the party which initiates the synchronized multimedia session.

In an embodiment of the invention, the user A or the first user at the first device 202 may initiate a synchronized multimedia session or synchronized interactive multimedia communication with the second device 204 for a multimedia content to be telecasted in future such as a TV program scheduled to be telecasted at a future time. The disclosed method for establishing interactive communication for a multimedia content or event to be telecasted or happen in future includes transmitting the first information about the TV program and the preferred time for watching the program to the second users by the first user. The method further includes collecting information about potential candidates or the one or more second users who would like to watch it together and their preferred time for watching it. Further, the method includes coordinating an agreed time for watching it together. Thereafter, a synchronized multimedia session may initiate. The users involved in the session may control the synchronized multimedia session and terminate it as per their own convenience. The method also includes collecting statistics about the synchronized multimedia session. It has been explained in detail in FIG. 3.

FIG. 3 illustrates an exemplary functioning of a home communication device including multimedia communication manager, in accordance with an embodiment of the invention. The environment 300 includes a first device network 312 and a second device network 314. The first device network 312 includes multiple first devices such as a mobile phone 310a, a TV 306a, and so forth. The multiple first devices may not include a multimedia communication manager. The first device can be an electronic device capable of communication or transmitting or receiving signals and information. Examples of the multiple first devices include, but not limited to, laptops, mobile phones, computers, telephones, televisions, PDAs, tablets, smart phones, pagers, and so forth. The first device network 312 also includes a home communication device 302a capable of interconnecting a plurality of devices. Examples of the home communication device 302a include, but not limited to, a Digital Video Recorder (DVR), a set-top box (STB), a home media gateway (HMGW), a media streaming device, an Integrated Access Device (IAD), a cable convertor box, a blu-ray player, a smart television and so forth. A remote control device 308a may be used to control one or more functions of the home communication device 302a. The home communication device 302a may include a multimedia communication manager 304a capable of performing the functions of the multimedia communication manager 206 as explained in FIG. 2. The multimedia communication manager 304a may be implemented as hardware, software or firmware in the home communication device 302a. The multimedia communication manager 304a may also be implemented as an interface to a cloud based service with the same functionality.

Further, the multiple first devices can access one or more features of the multimedia communication manager 304a via the home communication device 302a only. Further, the remote control device 308a may include one or more exclusive keys for accessing the one or more functions of the multimedia communication manager 304a. In an embodiment of the invention, a keypad associated with a first device such as the mobile phone 310a includes one or more exclusive keys for accessing one or more features of the multimedia communication manager 310a. The multimedia communication manager 304a may display or include a first exclusive menu for accessing one or more features of the multimedia communication manager 304a. The first exclusive menu can be accessed by first users by pressing the one or more exclusive keys. In an embodiment of the invention, the first device 202 may include the multimedia communication manager 206 as shown in FIG. 2. The first device network 312 may be a computer network such as, but not limited to, a LAN, a MAN, a home communication network, a Wi-Fi network, a Bluetooth network, and so forth.

The environment 300 also includes a second device network 314 including multiple second devices such as a mobile phone 310b, a TV 306b, and so forth. The second device network can be a computer network such as, but not limited to, a LAN, a MAN, a home communication network, a Bluetooth network, a Wi-Fi network, and so forth. Examples of the second devices can be such as, but not limited to, laptops, computers, mobile phones, telephones, PDAs, tablets, smart phones, pagers, and so forth. The second device network 314 includes a home communication device 302b for interconnecting multiple second devices with one or more first devices. The home communication device 302b also includes a multimedia communication manager 304b for establishing and managing multimedia communication with the one or more first devices and other devices. Further, the second devices can access one or more features of the multimedia communication manager 304b via the home communication device 302b only. A remote control device 308b may be used to control one or more features or access one or more functions of the home communication device 302b or the multimedia communication manager 304b. The multimedia communication manager 304b may be implemented as hardware, software or firmware in the home communication device 302b. The multimedia communication manager 304a may also be implemented as an interface to a cloud based service with the same functionality.

In an embodiment of the invention, the remote control device 308b may also include one or more exclusive keys for accessing the one or more features or functions of the multimedia communication manager 304b. Further, the multimedia communication manager 304b can display and include a second exclusive menu when a second user presses one or more exclusive keys at the remote control device 308b. The multiple first devices of the first device network 312 may initiate or communicate with the multiple second devices of the second device network 314 via a network 120.

As discussed with reference to the FIG. 2, the first user such as the user A can generate a multimedia session with the second user such as the user B. When the multimedia communication manager 302a is embedded in the home communication device 304a, the user A can initiate the multimedia session for a currently airing multimedia event such as a football match by pressing the one or more keys at the remote control device 308a. This will enable user to establish the multimedia interactive communication with one or more second users as described in FIG. 2. Further, each of the first devices and/or the home communication device 302a may include a social computer networking client such as a Twitter client, a Facebook application, and so forth. Users associated with the first devices are connected to a social computer network.

In an embodiment of the invention, the first user such as the user A in the first device network 312 may schedule a multimedia session for a multimedia content to be telecasted at a future time with the second user(s) such as the user B. When a user who is at home in front of his TV and using a remote control device 308a and the home communication device 302a such as a DVR for generating a multimedia session with the one or more second users (or the user B). However, the same process can be achieved from other first devices also such as a mobile device, a laptop, a smart phone, and so forth which include the appropriate remote programming application to connect to the home communication device 302a. Further, each of the second devices and/or the home communication device 302b may include a social computer networking client such as a Twitter client, a Facebook application, and so forth. Users associated with the second devices are connected to a social computer network.

The following steps may be followed for generating a synchronized multimedia session or synchronized interactive multimedia communication for a multimedia content or event to be happened in the future. The user A can select a TV program which the user A would like to watch in the company of other users (or second users) browsing a program guide on the home communication device 302a (or DVR/STB). The user A highlights the TV program name and clicks at least one exclusive key at the remote control device 308a. The multimedia communication manager 304a displays a graphical user interface (GUI) associated with the home communication device 302b asking "What is the preferred time to watch the selected TV program?" and may offer the user A with two options: 1) "At the original designated time of the program" (the time listed on the program guide). If selected it means the TV program or the multimedia event (or content) will be watched in real-time, 2) "At a different later time: Please specify the time as: MM/DD/Time" The user A then can enter his preferred time.

The multimedia communication manager 304a may also initiate a first message to the one or more second users notifying them that the user A is interested to watch the given TV program, with the program's details, a proposed time for watching it and with a first URL associated with the selected TV program. The first message may be in any format which is compatible with the TV service provider's GUI concepts. A typical example is: "Would you like to watch <the TV program name from the service provider's program guide> at MM/DD/Time with me? <Short URL>". The first message may include information such as, but not limited to, an IP address information of the home communication device 302a, the multimedia communication manager 304a, and the user A (this information does not compromise user privacy setup), details about the TV program to be watched, a second URL associated with the third device such as a server, time schedule of the TV program, and so forth.

Further, the multimedia communication manager 304a adds the program to a first synchronized list on the home communication device 302a. The TV program may also be recorded if the home communication device is capable of recording the program at the time it is broadcasted or immediately if this is a VoD program. In an embodiment of the invention, the multimedia communication manager 304a or 304b which runs on each of the home communication device 302a and 302b has a social computer networking client which gets one or more messages for whoever the user is following the user A. When such a message is received by one of user A's followers (such as user B) the multimedia communication manager 304b may display a semi transparent pop up message on the TV screen of each of the second users (user B) for a few seconds, after which it fades away. The multimedia communication manager 304b may also add the program indicated in the received first message in the second synchronized list, together with its proposed time, and adds the name of the sender (i.e. the user A) to a second viewers list at the second device. The second synchronized list can be accessed from the second exclusive menu on the home communication device 302b. The program is not being recorded. Further, a scheduled TV program may be indicated ay by blinking a LED on the front panel of the home communication device 302b or the first device such as a TV with a blinking pattern which indicates a scheduled multimedia event. The multimedia communication manager 304b will keep this blinking pattern until the user B accepts the invitation to join the synchronized multimedia session for this TV program or until user B rejects the invitation or until the program has completed its live transmission or until user A cancels the invitation. The program information is removed from the second synchronized list when the user B chooses an option other than accepting the invitation to join.

In an embodiment of the invention, if user B is currently in front of his TV, watching some program and gets the first message from the user A as a semi transparent popup message on his screen. The popup message may provide him with three options. During the time of the popup message he can pick his remote control device 308b and select how he would like to watch that TV program together with user A by pressing the (1), (2) or (3) keys on the remote control device 308b to select between the options. Option (1) may be to watch the TV program at the time suggested by the user A. When the user B selects option 1, the second device (or the home communication device 302b) transmits a second message of the form: "Would you like to watch <the TV program name from the service provider's program guide> at MM/DD/Time with me? <Short URL>". The MM/DD/Time is the same as in the incoming message. The name of the program is the same name which was indicated in the user A's message, regardless of the program that the user B is currently watching. The program indicated in the received first message and its proposed time is already stored in the second synchronized list as a result of the incoming first message. The second synchronized list can be accessed from the second exclusive menu on the home communication device 302b. Further, the program is not being recorded. The user B broadcasts to all his friends or followers associated with social computer network of the user B including the user A but not limited to user A alone. The user A may decide to watch this program with user D and not necessarily the user B. The user B might get a confirmation from the user A or a response from another user associated with the User B's social computer network who would like to watch this program. The overall effect is a ripple broadcast effect of Social TV events for this specific program.

An option (2) may be to watch the TV program but at a different time than what is suggested by the user A. When the user B selects the option 2, the multimedia communication manager 304b may put the current TV program on hold and take the user B to the second exclusive menu, the submenu which allows the user B to specify an alternate MM/DD/Time for watching this program. The multimedia communication manager 304b also transmits the second message of the form: "Would you like to watch <the TV program name from the service provider's program guide> at MM/DD/Time with me?<Short URL>. The MM/DD/Time is the new time suggested by the user B. The name of the program is the same name which was indicated in user A's message i.e. the first message, regardless of the program that user B is currently watching. This may initiate a two way interaction between the user A and user B. Further, the multimedia or TV program indicated in the received first message is already stored in the second synchronized list as a result of the incoming first message. Its time information is updated to reflect the user B's preferred time. The second synchronized list can be accessed from the second exclusive menu on the home communication device 302b. The program is not being recorded. Thereafter, the TV program which the user B was watching is restored.

An option (3) may be to reject the invitation received from the user A. If this option is selected by the user B, in this case, the program information is removed from the second synchronized list. No second message or further messages are sent and no further action will be taken. Further, the blinking pattern indication of the invitation is stopped.

In an embodiment of the invention, if the user B prefers to respond or address the invitation (i.e. the first message) later and ignore the popup message, or in case the user B is away from the home communication device 302b (his DVR/STB) and at a later time notices the blinking pattern indicating a pending first message and invitation or request to join a multimedia session (or multiple invitations) he can always access a second submenu such as a "People Interactions Menu" of the second exclusive menu from the home communication device 302b. Further, the multimedia manager 304b may present invitation or first messages along with their status of the TV program or multimedia content. The status of the first messages which are pending may be indicated by using an appropriate color code. Pending invitations or messages are listed with their own dedicated color. The user B can select each of these programs, which also includes its proposed time. When selected, the user B may be presented with the same three options (1), (2), (3) as described above.

In an embodiment of the invention, the first message transmitted by the user A is received by each of the user A's friends associated with the social computer network of the user A on their mobile devices such as a mobile phone social computer networking client. Each of the user A's friends can see the TV program information along with the time the user A has proposed for synchronize watching it. If they (friends or the second users) are close to their home communication devices such as the home communication device 302b (DVR/STB/TV). If the user B wants to watch this program together with User A then the user B may go to the second exclusive menu on the home communication device 304b's main menu and select the second synchronized list which may include invitations or the first message for the candidate programs. Each scheduled multimedia or TV program invitation, together with its proposed time, is indicated in a dedicated color, different from other TV program for realtime watching. The user B then can select a scheduled multimedia or TV program invitation from the second synchronized list. Further, the user B may select one or more second users (user B's friends) from a second viewers list at the second device. The second users are the users who would like to watch the scheduled TV program or the multimedia content with the user B. When selected, the multimedia communication manager 304b may present the user B with the three options (1), (2), (3) as described above.

In an embodiment of the invention, when the user B of the second device is far away from their home communication device 302b (or DVR/STB/TV) and they are subscribers to the multimedia communication manager 304b associated with the home communication device 302b, then they can use the multimedia communication manager's portable application which may run on their smart mobile device to respond and schedule a Social TV event.

In an embodiment of the invention, when the user B does not have the multimedia communication manager's portable application then he can still respond later, when he returns home. Therefore, when the user B returns home he sees the LED blinking on the home communication device 302b (or STB/DVR) indicating that the user B has one or more new incoming messages and the pending invitations. The user B can then use the remote control device 308b for performing one or more steps listed as above.

If the second device(s) is not subscribed to the multimedia communication manager features, or not subscribed to that service provider's plan, the user B can follow the second URL provided in the first message. This scenario has also been explained in FIG. 4.

In an embodiment of the invention, the user A may also receive the second message from the device(s) associated with the user B or the one or more second users. When the user A gets the second message(s) inviting him to view a TV program with the user B or the one or more second users (or a remote friend/family member), with the format of: "Would you like to watch <the TV program name from the service provider's program guide> at MM/DD/Time with me?<Short URL>. The multimedia communication manager 304a may generate a semi transparent popup message on the TV screen or the first device 202 indicating that the user B is inviting the user A to watch a scheduled multimedia program or TV program with the user B. After a few seconds the message may fade away. If the received second message is a reply to the first message with the same TV program name it means that this TV program already has an entry in the first synchronized list on the home communication device 302a (or DVR/STB), along with the time which the user A originally proposed. In an embodiment of the invention, the home communication device 302 (or the first device 202) may also include a recording list which may include the TV program which is to be recorded. The name of the sender (i.e. user B in this example) is added to the first viewer's list at the first device who would like to watch the scheduled TV program with him, along with the time they proposed. In an embodiment of the invention, the proposed time can be different than the time of TV program mentioned in the first message. If the second message is not a reply for an invitation he sent earlier, it means the user B or the one or more second users are inviting the user A to watch another program, which is a symmetrical situation to step 2 above. In that case the program is added to the first synchronized list on the home communication device 302a or the first device 202. Thereafter, the user A can choose to respond accordingly. Further, the multimedia communication manager 304a indicates an incoming second message by blinking a LED on the front panel of the home communication device 302a with a blinking pattern which indicates a scheduled multimedia event or program. The Social TV module will keep this blinking pattern until the user A goes to a submenu of the first exclusive menu such as "People Actions" menu on the home communication device 302a and then may decide what to do with this new invitation or scheduled invitation. In an embodiment of the invention, the user may not take any action before the program is over, then the blinking may stop and the TV program information is removed from the first synchronized list.

In an embodiment of the invention, if the second message is a response to user A's first message then during the brief time the semi transparent message is displayed, the user A can approve the user B's response with a single press of the at least one exclusive key at the remote control device 308a.

In an exemplary scenario, the user A may finalize the scheduled TV program or the multimedia program when the popup message i.e. the second message is received as follows: 1) from the first exclusive main menu go to the "People Actions" sub menu and from there to the another sub menu. 2) The list of all the ad-hoc (currently running) and scheduled TV program candidates is displayed. Select a scheduled program from the list. The user A may choose to select an ad-hoc program too, the ad-hoc program is a currently aired program or multimedia content.

For each selected program: a list of friends/family members who wants to watch it with him is displayed, together with their preferred time for watching. If the time is the same as his original proposal, it is colored in green (or may be any other color not limited to green only). If it does not match (meaning that the user B would like to watch it with him but at a different time) it is colored red (or may be any other color not limited to red). Then the user A may select a second user with whom he/she would like to watch it with.

When the second user (i.e. the user B) is selected, the system checks if the times match (i.e. the original time proposed by the user A and the time offered by the second message from the user B or the one or more second users). If the times match a direct point to point message i.e. a third message is sent to the selected second user or the user B. When this third message is received on the home communication device 302b of the user B it highlights the name of the user A on that specific TV program in the second synchronized list (either with a unique color, or with the prefix "Accepted"). Also, the home communication device 302b adds the TV program on the second recording list of the home communication device 302b of the user B. The home communication device 302b may program the multimedia communication manager 304b to initiate a synchronized multimedia session or communication for this specific TV program at the designated time. Send a broadcast or a multicast fourth message with the format of: "Social TV request for <the TV program name from the service provider's program guide> at MM/DD/Time is no longer active <Short URL>". This message may have no effect on the home communication device 304b of user B, and the fourth message does not generate any pop up message on the second device 204 or the device associated with the user B. On the home communication device 304a of every user (except for user B) the fourth message is displayed for a brief moment on the TV screen, and the name of the user A is removed from the list of people for that specific TV program in the first synchronized list. If the name of the user A was the only one on that list then the TV program itself is removed from the first synchronized list. Also, the name of user B is highlighted on that specific TV program in the first synchronized list of user A (either with a unique color, or with the prefix) and it may also program the multimedia communication manager 304a of user A to initiate a synchronized multimedia session or communication for this specific TV program at the designated time.

If the times do not match then the multimedia communication manager 304a may offer the user A with two options: "Accept the user B's proposed time" In this case the following the multimedia communication manager 304a changes the scheduled time of the TV program on the home communication device 302a of user A to match the time suggested by the user B. In an embodiment of the invention a direct point to point message may be sent to the one or more second users or the user B. When this message is received on the home communication device 302b of the user B, the name of the user A on that specific TV program in the second socialized list is highlighted (either with a unique color, or with the prefix "Accepted"). Also the TV program is added in the second recording list on the home communication device of the user B. Further, the multimedia communication manager 304b may be programmed to initiate a synchronized multimedia session or communication for this specific TV program at the designated time.

In an embodiment of the invention, the user B may suggest an alternate time for the scheduled synchronized watching, which might be acceptable to both users i.e. the user A and B. In this case user A may send another message with the format:"Would you like to watch <the TV program name from the service provider's program guide> at MM/DD/Time with me? <Short URL>". The difference is that the MM/DD/Time of the second message matches the proposed time of the user B. The process, as described above repeats itself for the new proposed time.

In an embodiment of the invention, at a pre-defined time interval prior to the proposed designated time or the scheduled time for a TV program, the multimedia communication manager 304a may pop-up a reminder message as a semi transparent message on the TV screen (or the first device 202) of the user A to remind him of the scheduled TV program or multimedia program. The multimedia communication manager 304a may also generate a rapid LED pattern on the home communication device 302a (and optionally sounds an audio chime if the HW of the DVR/STB is equipped with an internal buzzer). The reminder message may also be a text message, an audio message, a video message or a combination of these.

When the scheduled time of the TV program arrives the multimedia communication manager 304a may initiate a bidirectional synchronized multimedia session or communication. In an embodiment of the invention, the multimedia communication manager 304a may open a small picture in picture window on the TV screen (or the first device 202) where a video conferencing with the second device 204 or the user B may take place, with the video conferencing audio superimposed on the audio of the TV program. Further, the location of the video conferencing window and mixed volume level can be configured depending on the user A's preferences. The control of the home communication devices 302a and 302b may also be synchronized to enable each side to be able to 'Pause', 'Fast Forward' or 'Rewind', or 'skip back a few seconds' for an instant replay. Another synchronized control is the ability to stop watching the scheduled recorded program and the user A and B may switch to a live channel, in case the program they originally planned to watch turned up to be a bad choice, but they still would like to utilize the opportunity and watch something else together. The multimedia communication managers automatically compensate for any delays in the TV program video which might exist due to the differences in transmission paths or transmission sources. Further, each side can terminate the session at any time.

In another embodiment of the invention, an interactive multimedia session for one or more TV programs (or multimedia content) with controlled access may be established between the first user(s) and the second user(s). In an embodiment of the invention, the synchronized interactive multimedia communication may be established based on one or more keys. In an embodiment of the invention, the access to the one or more programs may be controlled by a third user. Further, the duration of session may also be controlled by the third user. For example, the parents may set a virtual session or play date for their kids on their TV. The multimedia communication manager 304a may be used by the user A to schedule an interactive multimedia session with controlled access with the second devices. For example, if two kids, a kid A associated with the first device and a kid B associated with the second device wants to have a virtual play date, then their parents or mother may set the virtual play date by using the multimedia communication manager on their respective home communication devices (i.e. DVR or STB or smart TV). Following are the steps for setting a virtual play date for the kids A and B. The mother A of the kid A may press one or more first exclusive keys on the remote control device 308a to access a first submenu such as 'Peoples Interaction'. Then the mother A may create a new play date profile from a second submenu such that 'Virtual Play Date'.

The mother A then may select the TV contents (or the multimedia content) for this profile. According to an embodiment of the invention, the mother A may be offered with three choices by the multimedia communication manager 304a such as Select a channel: In this case the entire contents of that channel is permitted for watching (like DisneyXD), Select a Season Pass: In this case all the programs of this type are permitted for watching (like SpongebobSquarepants, Tom and Jerry etc.), and Select specific programs: This option is also aimed for VoD (Video on Demand) programs from the available collection of the service provider and EoD (Education on Demand) which may include educational contents streamed form the Web.

The mother A then sets a timeframe for that profile. For example: Between 10:00-12:00 and 15:00-18:00 on weekends and between 15:00-18:00 on week days. The multimedia communication manager 304a may prompt the mother A to name this profile. In an embodiment of the invention, multiple profiles can be created, and named. In another embodiment of the invention, the entire process of creating a new kids profile may be password protected such that only the parents or an authorized person can do it.

The multimedia communication manager 304a may allow the mother A to generate a play date password key which she can do by selecting an option from the second submenu i.e. "Virtual Play Dates" menu. When selected, it allows the mother A to choose a profile and then generates a random password key. The password key may include numbers, alphabets, or a combination of these. A key can be used until revoked by the same party i.e. the mother A which generated it, and the same key will never be generated again.

The multimedia communication manager 304a which runs on the mother A's home communication device 302a may also save entries for new key on the home communication device 302a and/or on the service provider's database at a back-end server. The saved entries may include information such as the IP address of the home communication device 302a of the mother A. The mother A can share this key information with her kid A. The mother A can send this key as a text message, a Short Message Service (SMS) message, an E-mail, an instant message, or via a social network messaging (through a social networking website status messages or mails). In an embodiment of the invention, the mother A can also write this key on a piece of paper and give it to her kid.

The same process is done by the mother B and kid B to create a profile and generate password keys. Thereafter, the kid A and the kid B may exchange the play date keys required for establishing the interactive virtual play dates. (Let's designate them Play date key A and play-date key B). The keys can also be exchanged via text message on a mobile device (such as the Mother B's cell phone), instant message, an SMS message, an E-mail, or via a social network messaging, or by writing one a piece of paper.

After the keys have been exchanged the kid A can ask his/her mother A to enable the virtual play-date for him on the first device. In an embodiment of the invention, the kid A cannot do it himself since this operation requires the parents password or a third user set password. The mother A can communicate with the mother B on the phone, use an SMS or IM message or exchange e-mail messages to discuss the virtual play date. Further, the mother A can ask her kids questions about kid B and decides whether to allow a play-date or not. If she decides to allow it she goes to the second submenu i.e. "Virtual Play Date" sub menu on her home communication device 302a. The system may ask for her password for authentication. The system displays a list of profiles and the keys generated on the local home communication device 302a and ask her: "Please select the key to be paired with". Thereafter, the mother A may select Play-Date Key A. In an embodiment of the invention, the mother A may use the numeric keypad on her remote control device 308a to enter the value of Play-Date Key B which she got it from her kid A who had received from the kid B. In an embodiment of the invention, the mother A can get the Play-Date Key B also as a text message on her phone, via e-mail or a social network messaging. The system (home communication device 302a) then gives her the option to name this Virtual Play-Date pair with a nickname. In an embodiment of the invention, a good nickname would be the name of the kid B. The system may save the key pair locally on the home communication device 302a and also on the service provider's back-end server database. The multimedia communication manager 304a on home communication device 302a gets the IP address of home communication device 302b from the service provider's registration database. The same process is repeated by mother B and kid B with Play-Date Key A. In an embodiment of the invention, one key may not be enough for creating a virtual play-date event. Two keys are needed and are paired together, and it means that both mothers had a chance to decide whether they would like to allow the virtual play date or not.

In an embodiment of the invention, after the setup steps are completed (creating the profiles, generating keys and pairing the keys) the kid A may initiate a virtual play-date on his own. The kid A may select a profile created for the kid B by the mother A by pressing one or more first exclusive keys at the remote control device 308a. In an embodiment, the multimedia communication manager 304a may display a list of all the available virtual play-dates (with their nick names; preferable the nickname is the same as kid B name, etc.) the following may happen: the home communication device 302b of kid B displays a message on the TV screen (or the second device): "Let's play together: press the Socialize key to start a Virtual Play-Date with <nickname of Key A& Key B pair>". In an embodiment of the invention, a unique audio may also be played through the TV speakers (or home theater audio system) to indicate an incoming virtual play date request.

The home communication device 302b of kid B blinks its LEDs in a blinking pattern which designates a virtual play date alert. If the home communication device 302ab hardware includes a buzzer it may be used for an alerting sound. In an exemplary scenario, if the mother B has a premium package such as a triple play package with the service provider their home phone may ring in a unique ringing pattern and when picked up an automated message says: "You are invited to a virtual play date. Please go to your TV and press the XYZ key(s)". When the kid B goes to his TV he sees the invitation from kid A on the TV screen. When he/she presses the XYZ key(s), the multimedia communication manager 304b initiates a bidirectional interactive multimedia session. Initially, the video conferencing window may occupy the entire screen and the multimedia communication manager 304b displays a list of the TV programs which they can watch together. This list may be the common/overlapping portion of the profiles designated by key A and Key B. Then, the kids A and B talk and agree about the program they would like to watch together (or just continue to use the video conferencing session). They both see the same list of programs and their remote controllers are synchronized together. Let's assume they decide to watch a SpongebobSquarepants episode together. When they select the TV program for synchronized watching the multimedia communication manager 304b automatically opens a small picture in picture window on the TV screen where the video conferencing between them takes place, with the video conferencing audio superimposed on the audio of the TV program. The location of the video conferencing window and mixed volume level can be configured. The multimedia communication managers automatically compensate for any delays in the TV program video which might exist due to the differences in transmission paths or transmission sources.

In an embodiment of the invention, the first and the second profiles and the first and the second keys are paired together on the first and second device and on the service provider back-end server. The first device is associated with the mother A and the kid A and the second device is associated with the mother B and the kid B.

The control of the home communication device 302a and home communication device 302b are synchronized, such as each side can pause, fast forward or rewind, or skip back a few seconds for an instant replay. Another synchronized control is the ability to change the allowed channels. When the TV program ends the multimedia communication manager 304b may switch back to full video conferencing mode and allows the kids to choose another program. The multimedia communication manager 304b and 304a may also check the time limits and notifies them a pre-defined time such as 10 minutes before their time limit (based on their profiles) is reached. Each side can terminate the session at any time.

Further, the first device associated with the mother A and the kid A is capable of enabling the mother A to generate one or more profiles specific to second user(s) i.e the kid B or other kids with one or more first parameters. The one or more first parameters may include, but are not limited to, program type, specific program name, days of week where the profile is active, hours of each day where the profile is active, and rating of the allowed programs on the first device.

Further, the second device(s) associated with the mother B or kid B is capable of enabling the mother B to generate one or more second profiles specific to the first user(s) i.e. the kid A or other kids with one or more second parameters. Example of the first parameter include, but are not limited to, program type, specific program name, days of week where the profile is active, hours of each day where the profile is active, and rating of the allowed programs on the second device.

The multimedia communication managers (on both sides i.e. 302a and 302b) can be configured to send one or more messages with status updates about the ongoing virtual play-date. This way the parents can track their kid's activities on any device capable of running a social computer networking client such as a Twitter client. The multimedia communication manager 304b and 304a may save the virtual play date event statistics in a local log file on the home communication device 302b and 302a respectively. In an embodiment of the invention, if at any point in time the mother A is not happy with the virtual play-dates between the kid A and the kid B she can go to the "Virtual Play Date" menu on her home communication device 302a and may revoke the permissions by choosing an option such as "Revoke a play-date key". The multimedia communication manager 304a may ask her to choose "Which of the keys generated at the local home communication device 302a do you want to revoke" and displays the list of active keys (with their nicknames, if created). The mother A then can select "Play-date Key A" from the list. When a key is revoked it is noted on the local home communication device 302a (it is no longer active key) and also on the service provider's back-end server database.

This profile based "dual Play-date key" method is very flexible. It may allow the parents to create multiple profiles which are tailored for specific situations. For example: a profile for weekends and a profile for week days which differ in the number of hours their kids are allowed to watch TV and have virtual play dates. For each profile the multimedia communication manager 304a can generate any number of play-date keys. For this reason it is a good practice to only use a play-date key with one kid, and generate additional keys for play-dates with other kids. In the above described example: the kid A gave Play-Date Key A to the kid B. It may be possible but not recommended to give the same key (Play-Date Key A) to other kids. It is a good practice to generate separate keys if kid A would like to have virtual play dates with kid C, D. etc. In an embodiment of the invention, it may also be possible and practical to use more than one key for the same kid.

For the above example: Let's assume that the mother A allows her kid to watch TV more hours on weekends than during regular week days. She will create separate profiles for weekends and weekdays, and generate keys for each of them. The kid A can give kid B two keys which will allow them to tailor their play-dates to their convenience. If mother B does not differentiates between weekends and week days for her kid then the same key from kid B can be paired with the two keys generated by mother A, etc. Virtual Play Date Keys can easily be transferred in an SMS message or e-mail message between mothers if they know each other cell-phone number or e-mail addresses.

In an embodiment of the invention, if the kid B's home communication device 302b does not have the multimedia communication manager's Virtual Play Date feature package, then when the mother B gets to the Virtual Play Date sub-menu she gets a message inviting her to join this premium service package. In an embodiment of the invention, any one of the first user i.e. the kid A or the second user i.e. the kid B can terminate the synchronized interactive multimedia communication or multimedia session. In another embodiment of the invention, the mother A or the mother B may terminate the synchronized multimedia communication or session between the kids A and B.

FIG. 4 illustrates another environment 400 when a second device 402 does not include a multimedia communication manager and its features, in accordance with an embodiment of the invention. The environment 400 may include the first device 202 capable of communicating with the second device 402 via the network 120. As discussed with reference to FIG. 2, the first device 202 includes the multimedia communication manager 206 for generating a synchronized multimedia session or a synchronized interactive multimedia communication with the second device(s). The second device 402 is a device configured to receive information from the first device 202. Further, the second device 402 is configured to transmit one or more messages or the information to one or more second devices. The second device 402 and the first device 202 are connected to each other via a social computer network or social computer networking web site such as, but not limited to, Facebook, Twitter, Orkut, and so forth.

A first user or a user A at the first device 202 may generate a synchronized multimedia session with the second device 402. The user A may send a first information about a TV program or a multimedia content (currently airing or to be telecasted in the future) to the second device 402. As described in FIG. 2 and FIG. 3 a pop up message may be displayed at the second device 402 to indicate an incoming first message. The second device 402 does not include a multimedia communication manager and may not be subscribed to multimedia communication manager's features or may not be a subscriber to the same service provider (as of the user A). Now in such a scenario, the user B at the second device may respond to the first message by clicking on the second short URL embedded in the first information. The second URL may direct the user B to a third device (server) or a web site which offers him an easy way to upgrade service. The web site can reside on a multimedia communication manager server or it can reside on a TV/Telecommunications service provider's backend server. For the following discussion we assume the web site is hosted on user A's service provider's backend server. The website may ask the user B to fill the necessary information fields (such as his name, contact info, etc.) in the form provided by the website. Then, at the server, user B's name is checked in the customer data base of User A's service provider. If user B is a subscriber but does not yet have the multimedia communication manager's premium feature(s) set then the user B may be offered a promotional price for adding this feature set to his current package. If the user B accepts this offer the new features are remotely downloaded to the user B's home communication device or at the second device itself. Thereafter, the downloaded features may be installed such that the user B can start using and participating in synchronized interactive multimedia communication and synchronized multimedia sessions. Alternatively, these services may be offered as a cloud based services, with just a thin client on user B DVR or STB or Smart TV, etc. In this case the services are cloud based.

In an embodiment of the invention, the user B may not be a subscriber of the user A's service provider. In that case, the user B may be offered a tempting package deal for moving from his/her current service provider such as a second service provider to the user A's service provider i.e. a first service provider. For example: getting the multimedia communication manager's features for free for a certain number of months. If the user B accepts this promotion it is logged as a customer acquisition transaction which resulted from the multimedia communication manager.

FIG. 5 illustrates another environment 500 when a home communication device 502 associated with second device(s) does not include multimedia communication manager and its features, in accordance with an embodiment of the invention. In the environment 500, the first device network 312 and the second device network 314 are connected via network 120. As discussed with reference to FIG. 2, the multiple first devices such as mobile phone, TV are connected to the home communication device 302a. Further, the home communication device 302a may include the multimedia communication manager 304a for generating a synchronized multimedia session or a synchronized interactive multimedia communication with one or more second device(s) present in the second device network 314. Further, the multiple first devices can access one or more features of the multimedia communication manager via the home communication device 302a only. Further, the first devices and the second devices are connected to each other via a social computer network or social computer networking website such as Orkut, Facebook, and so forth. The second device network 314 may include the second devices. Further, the second devices are connected to the home communication device 502. The home communication device 502 may not include a multimedia communication manager and may not be subscribed to features of the multimedia communication manager from any service provider. As described in FIG. 3. The user A (the first user at the first device 202) may send the first information associated with the selected multimedia content or TV program to initiate a synchronized session. The home communication device 502 may have an embedded social computer client (such as a Twitter client). The home communication device 502 associated with the one or more second device receives the first information and may display a message at the second devices displaying information associated with the selected TV program. Alternatively, the second devices may have an embedded social computer client (such as a Twitter client). As the home communication device 502 is not subscribed to the multimedia communication manager's features and don't include the multimedia communication manager, therefore, the second user (s) may respond to the first message by performing the steps as described in the description of FIG. 4 above.

The user B at the second device may respond to the first message by clicking on the second URL embedded in the first information. The second URL may direct the user B to a third device (i.e. a server) or a web site which offers him an easy way to upgrade service. The web site can reside on a multimedia communication manager's server associated with the multimedia communication manager 304a (or 304b) or it can reside on a TV/Telecommunications service provider's backend server. For the following discussion we assume the web site is hosted on user A's service provider's backend server. The website may ask the user B to fill the necessary information fields (such as his name, contact info, etc.) in the form provided by the website. Then, at the server, user B's name is checked in the customer data base of User A's service provider. If user B is a subscriber but does not yet have the multimedia communication manager's premium feature(s) set then the user B may be offered a promotional price for adding this feature set to his current package. If the user B accepts this offer the new features are remotely downloaded to the user B's home communication device or at the second device itself. Thereafter, the downloaded features may be installed such that the user B can start using and participating in synchronized interactive multimedia communication and synchronized multimedia sessions. Alternatively, these services may be offered as a cloud based services, with just a thin client on user B DVR or STB or Smart TV, etc. In this case the services are cloud based.

In an embodiment, the user B may not be a subscriber of the user A's service provider then the user B may be offered a tempting package deal for moving from the current service provider such as a second service provider to the user A's service provider i.e. a first service provider. For example: getting the multimedia communication manager's features for free for a certain number of months. If the user B accepts this promotion it is logged as a customer acquisition transaction which resulted from the multimedia communication manager.

FIG. 6 illustrates a cloud based environment 600 when a service provider network 604 provides features of a cloud based multimedia communication manager 606, in accordance with another embodiment of the invention. A first device 602 and the second device 402 have a web interface or a thin client and may communicate to each other via a service provider network 604. The multimedia communication manager 606 can manage synchronized interactive multimedia communication between the first device(s) 602 and the second device(s) 402. Further, the multimedia communication manager 606 may generate a synchronized multimedia session and/or synchronized interactive multimedia communication with the second device 402. A first user at the first device 602 may send a first request for initiating a multimedia session or synchronized interactive multimedia communication with the second device 402 (or the second devices) to the service provider's network. The first request may include the details associated with a multimedia content or program which the first user wants to watch with other second users. The first request may also include details about the first user 602 and the second user 402. The first request is based on a multimedia content or TV program selected by the first user. The multimedia communication manager 606 at the service provider network 604 may generate first information corresponding to the first request received from the first device. The first information may be generated based on one or more parameters set by the first user. Examples of the one or more parameters include, but not limited to, an internet protocol (IP) address associated with the first device 602, details associated with the multimedia communication manager 606, time schedule associated with the multimedia content (i.e. selected TV program), a first uniform resource locator (URL) associated with the multimedia content; service information wherein the service information may include a second URL associated with a third device, and so forth. The third device can be a server or a service provider's backend server.

The multimedia communication manager 606 then may present (or transmit) the first information to at least one second user such as the second user. The multimedia communication manager 606 may also process the first information to generate a synchronized multimedia session with the second device 402 and the first user 602. A pop up message corresponding to the first message is displayed at a screen of the second device 402. The second user at the second device 402 can respond to the first message accordingly depending on the availability of the second user at the device as described in FIGS. 2, 3, 4, and 5. All the processing of messages and information happens at the service provider network 604 which is a cloud based service. The services hosted on the cloud based backend servers of service provider network 604 implements all the features for the first device 602 and the second device 402 as described in FIGS. 2, 3, 4, and 5.

FIG. 7 illustrates an environment 700 when the service provider network 604 includes a cloud based multimedia communication manager 606, in accordance with an embodiment of the invention. The environment 700 includes the first device network 312 and the second device network 314. The first device network includes a home communication device 702 connected to multiple devices. The home communication device 702 does not include a multimedia communication manager and may not support the features of the multimedia communication manager, however, it includes a web interface or a thin client through which it can communicated with the services provided by the multimedia communication manager 606 embedded in the service provider network 604. The features and functionality of the multimedia communication manager as described in above figures may be provided by the cloud based multimedia communication manager 606 embedded in the service provider network 604.

The second device network 314 may include multiple second devices. The multiple second devices are connected to a home communication device 502. The home communication device 502 may not include a multimedia communication manager. Each of the first devices can communicate with the second devices of the second device network.

The multiple second devices and the home communication device 502 can access the cloud based multimedia communication manager functions or features by sending requests to the service provider network 604. The service provider network 604 may act as an interface between the plurality of first and the second devices as described with reference to FIG. 6. A first user of the first device may send a first request to generate a multimedia session or synchronized interactive multimedia communication with the second user (s) associated with the multiple second devices. The first user and the plurality of second users are also connected to each other via a social computer network such as a Facebook network. The first request is forwarded to the service provider network 604 by the home communication device 702. The cloud based multimedia communication manager 606 may generate first information based on the first request. The first request may include user preferences related to the selected multimedia content such as time and date of multimedia content, details about second devices with whom the user may want to watch the multimedia content with, and so forth. The multimedia communication manager 606 may also present (or transmit) the first information to the second devices based on the user preferences mentioned in the first request. Thereafter, a pop up message may be displayed at the second devices indicating an incoming first message including the first information. The second user at the second devices may respond to the first message by sending a second message as described in FIG. 2 to FIG. 6.

With reference to FIG. 8 exemplary elements of the home communication device 302a associated with the first device 202 for managing communications are illustrated, in accordance with an embodiment of the invention. The home communication device 302a includes a processor 802, a memory 804 and multiple interfaces 806. The home communication device 302a is connected to the first device. Although not shown, a person skilled in the art will appreciate that various other components may be present in home communications devices 206 such as a power source. As shown, interfaces 806 may include various ports such as Telephone Jacks such as RJ 11 ports 820, RJ 45 LAN ports 822, Universal Serial Bus (USB) ports 824 and wireless ports 826 such as Wi-Fi and Bluetooth. RJ 11 ports 820 may be used to connect telephony devices such as ordinary telephone systems or Digital Enhanced Cordless Telephone (DECT). Similarly, RJ 45 ports 822 may be used to connect devices that support data transfer through Ethernet. Wireless ports 826 may provide connectivity through protocols such as Bluetooth, Infrared, Wi-Fi and so forth. Therefore, as shown home communications device 206 may be connected to various types of devices supporting separate and/or multiple communication protocols. A person skilled in the art will appreciate that other communication protocols can be supported in a similar manner by the addition of more interface modules.

The interfaces 806 may also include a display interface 816 to connect to a display 830. The display 830 may be used to display one or more information received at the home communication device 302a. The interfaces further includes an input/output interface which may be used to connect to multiple input/output devices such as a mouse, a keyboard, a web camera, a joy stick, a printer, a projector, and so forth.

The memory 804 includes a multimedia communication manager 808 for generating synchronized multimedia session between the first device and the second device as shown in FIG. 2 to FIG. 5. The multimedia communication manager 808 may include a web interface or a thin client in case the features and services are implemented in the cloud, as shown in FIG. 6 to FIG. 7. The memory 804 further includes a database 810 storing one or more lists such as the first synchronized multimedia list, the first viewer's list and so forth. The database 810 may also store details about different multimedia programs (content) and/or users associated with the home communication device 302a. The database 810 may also include details about the multiple first devices connected to the home communication device 302a. In another embodiment of this invention, the database 810 may be implemented in the cloud. The memory 804 may also include a social computer networking client for communicating with one or more second users connected to the first user via a social computer network. The social computer networking client may be a Twitter client, a Facebook client and so forth. The multimedia communication manager may be implemented as firmware, software, hardware or a combination of these. The memory 804 may also include an operating system 814 to enable proper functioning of the home communication device 302a and/or multimedia communication manager 808.

Examples of the memory 804 include, but are not limited to, a Read Only Memory (ROM), a Random Access Memory (RAM), a hard disk, flash memory or other computer readable media capable of storing instructions that can be executed by processor 202. The multimedia communication manager 804 may include instructions that can be executed by the processor 802 to manage communication between devices. Further, the communication manager 808 may include the predefined preferences in the form of a rule engine. The database 810 includes information regarding the communication. For example, the database 810 may include contact information, usage statistics, user information, predefined user rules, log and trace files, data such as voicemail, email, and so forth. The processor 802, the memory 804 and the interfaces 806 are connected through a system bus 828. The multimedia communication manager 808 may be implemented as hardware, software, firmware or a combination of these in home communications device 206. In another embodiment of this invention, the multimedia communication manager 808 features may be implemented in the cloud, and the memory 804 includes a web interface or a thin client to communicate with the cloud based services.

FIG. 9 illustrates exemplary elements of the home communication device 302b for managing communications, in accordance with an embodiment of the invention. The home communication device 302b is associated with the second device. Further more than one device (or second devices) can be connected to the home communication device 302b. The home communication device 302b includes a processor 902, a memory 904 and multiple interfaces 906. Although not shown, a person skilled in the art will appreciate that various other components may be present in home communications devices 208 such as a power source. The interfaces 906 may include a display interface 916 to connect to a display 926. The display 926 may be used to display one or more information received at the home communication device 302b. The interfaces further includes an input/output interface 918 which may be used to connect to multiple input/output devices such as a mouse, a keyboard, a web camera, a joy stick, a printer, a projector, and so forth. Though not shown, a person skilled in art will appreciate that the interfaces 906 may include other ports such as Telephone Jacks such as RJ 11 ports, RJ 45 LAN ports, Universal Serial Bus (USB) ports and wireless ports such as Wi-Fi and Bluetooth. RJ 11 ports may be used to connect telephony devices such as ordinary telephone systems or Digital Enhanced Cordless Telephone (DECT). Similarly, RJ 45 ports may be used to connect devices that support data transfer through Ethernet. Wireless ports may provide connectivity through protocols such as Bluetooth, Infrared, Wi-Fi, and so forth. Therefore, as shown home communications device 208 may be connected to various types of devices supporting separate and/or multiple communication protocols. A person skilled in the art will appreciate that other communication protocols can be supported in a similar manner by the addition of more interface modules.

The memory 904 includes a multimedia communication manager 908 for generating synchronized multimedia session between the first device and the second device as shown in FIG. 2 to FIG. 5. The multimedia communication manager 908 may include a web interface or a thin client in case the features and services are implemented in the cloud i.e. the service provider network 604, as shown in FIG. 6 and FIG. 7. The memory 904 further includes a database 910 storing one or more lists such as the first synchronized list, the first viewer's list and so forth. The database 910 may also store details about different multimedia programs (content) and/or users associated with the home communication device 302b. The database 910 may also include details about the multiple first devices connected to the home communication device 302b. The memory 904 may also include a social computer networking client for communicating with one or more second users connected to the first user via a social computer network. The social computer networking client may be a Twitter client, a Facebook client, and so forth. The multimedia communication manager 908 may be implemented as firmware, software, hardware or a combination of these. The memory 904 may also include an operating system 914 to enable proper functioning of the home communication device 302b and/or multimedia communication manager 908. In another embodiment of this invention, the database 910 may be implemented in the cloud.

Examples of the memory 904 include, but are not limited to, a Read Only Memory (ROM), a Random Access Memory (RAM), a hard disk, flash memory or other computer readable media capable of storing instructions that can be executed by the processor 902. The multimedia communication manager 904 may include instructions that can be executed by the processor 902 to manage communication between devices. Further, the multimedia communication manager 908 may include the predefined preferences in the form of a rule engine. The database 910 includes information regarding the communication. For example, the database 910 may include contact information, usage statistics, user information, predefined user rules, log and trace files, data such as voicemail, email, and so forth. The processor 902, memory 904 and the interfaces 906 are connected through the system bus 928. The multimedia communication manager 908 may be implemented as hardware, software, firmware or a combination of these in home communications device 208. In another embodiment of this invention, the multimedia communication manager 908 features may be implemented in the cloud (or the service provider network 604), and the memory 904 include a web interface or a thin client to communicate with the cloud based services. Hereinafter, the cloud 604 may refer to the service provider network 604 and can be used interchangeably. In another embodiment of this invention, the database 910 may be implemented in the cloud.

FIG. 10 illustrates exemplary elements of the multimedia communication manager 808 associated with the first device 202 or in the home communication device 302a, in accordance with an embodiment of the invention. As discussed above, the multimedia communication manager 808 is associated with the first device 202 and may manage the communication through home communications device 302a connected to the first device 202. The multimedia communication manager 808 may include a first generator 1002. The first generator 1002 is configured to generate first information associated with a multimedia content selected by a first user. The first information is generated based on one or more parameters. Examples of the one or more parameters include, but are not limited to, an internet protocol (IP) address associated with the first device, details associated with the multimedia communication manager of the first device, time schedule associated with the multimedia content i.e. a TV program selected by the first user, a first uniform resource locator (URL) associated with the multimedia content, service information wherein the service information comprises a second URL associated with a third device such as a service provider server.

In an embodiment of the invention, the first generator 1002 is also configured to generate a first key to be shared with other users such as one or more second users. The multimedia communication manager 808 may also include a first transceiver 1004. The first transceiver 1004 is configured to transmit the first information to at least one second user. The first user and the at least one second user are associated with a social computer network such as a Facebook network. The first transceiver 1004 is also configured to transmit or receive one or more messages to and from the second devices. In an embodiment of the invention, the first transceiver 1004 is also configured to transmit the first key to each of the at least one second user for establishing a synchronized multimedia session. Further, the first transceiver 1004 is also configured to receive the second information from the second devices.

The multimedia communication manager 808 further includes a first adder 1006. The first adder 1006 is configured to add the selected multimedia content to a first synchronized multimedia list; and add the one or more second users associated with the second devices from which the second information is received to a first viewers list.

In an embodiment of the invention, the multimedia communication manager 808 may include a call manager 1008 which may be implemented as an enhanced Private Branch Exchange (PBX) for managing the communications. It provides all call control features (such as hold, forward, transfer, consult, add party, disconnect, etc.) and unified communications features. Further, the call manager 1008 may provide a unified interface for Public Switched Telephone Network (PSTN) lines, VOIP lines and cellular telephony. Moreover, the call manager can manage separate communication protocols such as Internet Protocol, Real-time Transport Protocol, Digital Enhanced Cordless Telecommunications, and radio telecommunication such as Bluetooth profiles support (headset and hands-free among others).

An exemplary processing of a communication request by the call manager 1008 can be explained with an exemplary scenario. Assuming that a communication request in form of a VoIP call is received at the home communications device 302a from the second device 204, then the communication request is processed by the call manager 1008 based on the predefined preferences. The predefined preferences may include rules such as, but not limited to, forward an incoming VOIP call to a mobile phone, or forward an incoming VOIP call to a landline telephone device, or display a video graphics (as a semi-transparent text) from the VOIP call on the television screen, or use an audio system such as home theatre system to generate the audio from the call or use a Bluetooth headset embedded in the TV remote control for the audio of the call and so forth. Moreover, the predefined preferences can be context sensitive to currently playing television program information and a program guide on a television connected to the home communications device 302a. Further, the call manager 1008 may determine the multiple first devices connected to the home communication device 302a before establishing a connection with the call. Accordingly, the incoming call is redirected to a first device based on the predefined preferences. For example, the call may be redirected to a Bluetooth enabled device that can be used for communication. Further, based on the predefined preferences, the call manager 1008 can initiate a second call to a telephone of the second user and may connect the VOIP call to the telephone. In an embodiment of the invention, this may be achieved by using Session Initiation Protocol (SIP) to connect the VOIP call with the landline. Therefore, the call manager 1008 can process the media format for communication between various media types or communication protocols. Further, the call manager 1008 can convert Bluetooth events and corresponding data into an appropriate SIP and/or Real-time Transport Protocol (RTP) frame formats such it seems like standard SIP/RTP data. The call manager 1008 can use a Rule-Engine module to process the predefined user preferences. Rule Engine module may include the set of predefined rules or default rules that may be used to process the user preferences. Further, the rule engine module may be based on heuristic logic and artificial intelligent inference logic.

The predefined preferences can be configured by the first user of the multiple first devices. The multimedia communication manager 808 may also include a user manager 1010 to enable the first user to configure the predefined preferences. Further, the user manager 1010 maintains information regarding the first users and the second users in database 810. For example, the information can be contact information, usage statistics, user information, data such as voicemail, email, channels subscribed by the user, channel viewing data, user profile, log and trace files and so forth. Moreover, the user manager 1010 can manage a presence status of the user. Examples of presence status include, but are not limited to, available, away, busy, offline, or other custom status values. Further, the user manager 1010 can set the presence status based on the activity of the user. For example, in case the user is watching a movie on an internal device such as a television, then the presence status may be updated to 'viewing movie'. Further, the presence status can be shared with other users over the computer network through applications such as Instant Messaging (IM), Short Message Service (SMS), and social computer networking sites such as Twitter, Facebook, Orkut, and so forth. For example, the user manager 1010 can change the Facebook status of the user to indicate the current TV program he is watching. The user manager 1010 can also collect information about the TV programs watched by the user and share it as part of the social computer network.

A first display manager 1014 provides a Graphical User Interface (GUI) for the user. Therefore, the user can configure home communications device 302a and the predefined preferences through the GUI. The first display manager 1014 may provide a GUI on any display device connected to the home communications device 302a. For example, the GUI may be displayed on a connected television, a computer screen, a mobile phone screen, a tablet and so forth. In an embodiment of the invention, the first display manager 1014 provides web based interface to the user. Therefore, the user can remotely configure the home communications device 302a by using a standard internet browser. In an embodiment of the invention, the remote configuration of the home communications device 302a is password protected. Moreover, the first display manager 1014 provides the user with a visual voicemail GUI that allows the user to play existing voice mail messages in any desired order, jump to any part of the played message or skip it altogether, delete messages or save messages. Further, the user can send the messages as e-mail attachments. Moreover, the first display manager 1014 can display the alerts generated by the call manager 1108. For example, the first display manager 1014 may display a pop-up on the first device such as television when a call or first information is received. Similarly, alerts may be displayed in case of an email or a voice mail. Further, the display manager 1014 can display semitransparent messages as popup messages on the screen. It can also create a picture in picture display for video conferencing. Alerts can be for example, in the form of a message displayed on a television screen or a secondary screen such as a tablet computer, a semitransparent popup message, a Light Emitting Diode (LED) blinking in a specific blinking pattern, an audio sound, and so forth. The first display manager 1014 can populate and synchronize a contact list from an internal device such as the user's cellular phone contact list with other first devices or the home communications device 302a by using the Bluetooth interface, or a contact list from the user's Internet Messenger, Internet Relay Chat (IRC) friends, social computer networks such as Facebook friends, online game friends, and so forth with other internal devices using a suitable protocol such as TCP/IP.

The multimedia communication manager 808 includes a device manager 1012 that manages the multiple first devices connected to the home communication device 302a. The device manager 808 identifies the type and number of the first devices connected to the home communication device 302a. Further, the device manager 1012 provides the information about the multiple first devices to the call manager 1008, the user manager 1010 and the display manager 1010 for proper functioning of the multimedia communication manager 808. For example, the device manager 1012 can manage multiple Bluetooth cell phone connections for multiple family members.

As discussed, the multimedia communication manager 808 manages various types of communication requests and configuration of the home communication device 302a. Although not described, a person skilled in the art will appreciate that the multimedia communication manager 808 can provide other functionalities such as conference calling, instant messaging, video conferencing, voicemail functions and other functionalities to the user. Further, the multimedia communication manager 808 may include an admin manager 1016 configured to download and execute management instructions in the home communication device 302a. For example, the instructions can include a software or firmware update for the home communication device 302a, the multimedia communication manager 808, and/or other modules of home communications device 302a.

In an embodiment of the invention, the multimedia communication manager 808 may include a first analyzer 1018 configured to process the information received from the second device(s) to generate a synchronized multimedia session b=of the first user with other users. The presentation of the multimedia content in the synchronized multimedia session is synchronized among the first device and the second device. The first analyzer 1018 can automatically compensate for any delays in the TV program video which might exist due to the differences in transmission paths or transmission sources.

FIG. 11 illustrates exemplary elements of the multimedia communication manager 908 associated with the second device 204, in accordance with an embodiment of the invention. In an embodiment of the invention, the multimedia communication manager 908 may be associated with the home communication device 302b. The multimedia communication manager 908 may include a second generator 1102, a second transceiver 1104, a second analyzer 1106, and a second adder 1108. The second generator 1102 is configured to generate a second key for establishing a multimedia session with the first device(s). The second transceiver 1104 is configured to receive the first information from the social computer network as discussed with reference to FIG. 2 and FIG. 3. The second transceiver 1104 can also transmit or receive one or more messages from the first device(s) for establishing the synchronized multimedia communication. In an embodiment of the invention, second transceiver is further configured to reply to the message based on the availability of the at least one second user; and availability of the multimedia communication manager at the one or more second device. Further, the second transceiver 1104 is configured to reply based on a selection, by the at least one second user, the service information for upgrading to the multimedia communication manager when the one or more second device does not include the multimedia communication manager. The second transceiver 1104 is further capable of receiving a selection of one or more first user messages from which the first information or message is received for synchronizing the multimedia session with a second user. Further, the second transceiver 1104 is configured to transmit second information or second message to the one or more first users, wherein the second information may include information such as reply information associated with the multimedia content, information associated with a second multimedia content, and so forth. Further, the second transceiver 1104 is also configured to transmit, to the one or more first users, a new time schedule associated with at least one of the multimedia content and the second multimedia content by the at least one second device.

The second analyzer 1106 may be configured to process the first information to generate a synchronized multimedia session with the second user(s) and the first user. The presentation of the multimedia content in the synchronized multimedia session is synchronized among the first device and the second device. The second analyzer 1106 can automatically compensate for any delays in the TV program video which might exist due to the differences in transmission paths or transmission sources.

The second adder 1108 is configured to add the multimedia content to a second synchronized multimedia list. The second adder is also configured to add the potential candidates for watching the multimedia content including the sender of the first message to a second potential viewers list. The multimedia communication manager 908 may also include a second display manager 1110. The display manager 1110 may be configured to manage the display at the second devices.

The multimedia communication manager 908 may also include other modules not shown in the FIG. 11. Examples of the other module include, but not limited to, a user manager, a device manager, and so forth, with similar functionality as described in FIG. 10. The user manager may also manage second user(s). The device manager may be configured to manage multiple devices such as first devices and the second devices.

FIG. 12 illustrates a flowchart for establishing a synchronized interactive multimedia communication among a plurality of users, in accordance with an embodiment of the invention. As discussed with reference to FIG. 2 and FIG. 3, the first device and the second device may share one or more messages and information to establish the synchronized multimedia session. According to FIG. 2 the first device 202 may include a multimedia communication manager 206 configured to generate and transmit first information to second users. The multimedia communication manager 206 is also configured to receive one or more messages from the second users or other devices via computer network 120. The second device 204 include a multimedia communication manager 208 configured to receive and process the one or more messages to establish the synchronized multimedia session with the first device 202. The multimedia communication manager 302a and 302b may include a social computer networking client such as Twitter client.

As discussed with reference to FIG. 3, the home communication device 302a may include the multimedia communication manager 304a and the home communication device 302b may include the multimedia communication manager 304b. In such a case the first device and the second device may not include the multimedia communication manager. The first device is connected to the home communication device 302a. Further, the multimedia communication manager 304a may initiate a synchronized multimedia session with the second device(s) by exchanging one or messages with the second devices or users. The second device may be connected to network 120 via the home communication device 302b. The multimedia communication manager 304b of the home communication device 302b may also receive one or more messages from the first device (s). The first user and the second user are connected via a social computer network. The multimedia communication manager 302a and 302b may include a social computer networking client such as Twitter client. According to an embodiment, the first device and the second device may not include multimedia communication managers.

In an embodiment of the invention, the home communication device 302a may be considered as the first device as in FIG. 3. Similarly, the home communication device 304b may be considered as the second device. With reference to FIG. 8 and FIG. 10, the multimedia communication manager 808 may include the first generator 1002, the first transceiver 1004, the first adder 1006, a call manager 1008, the user manager 1010, the device manager 1012, the first display manager 1014, and so forth.

With reference to FIG. 9 and FIG. 11, the multimedia communication manager 908 may include the second generator 1102, the first transceiver 1104, the analyzer 1106, the second adder 1108, and so forth. At step 1202, a first user at the first device (or a home communication device) may select a multimedia content such as a TV program. In an embodiment of the embodiment, the first user may select a multimedia content which he/she is currently viewing. In another embodiment of the invention, the first user may select a multimedia content or TV program which is scheduled to be telecasted in the future. In an embodiment of the invention, the first user may select the multimedia content from a program guide associated with a service provider. At step 1204, the multimedia communication manager associated with the first device (or the home communication device) may generate first information associated with the multimedia content based on one or more parameters at the first device. The one or more parameters can be, but are not limited to, an internet protocol (IP) address associated with the first device, details associated with the multimedia communication manager of the first device (or the home communication device), time schedule associated with the multimedia content, a first Uniform Resource Locator (URL) associated with the multimedia content, service information wherein the service information may include a second URL associated with a third device, and so forth. The third device can be for example, a server or a service provider device. At step 1206, the first information is transmitted to one or more second users associated with a social computer network. The second users are connected to the first user of the first device via the social computer network. The one or more second users may be associated with one or more second devices. A first transceiver 1002 of the first device transmits the first information to the second user(s).

At step 1208, the first information is received at the one or more second devices from the social computer network. The social computer network may be network (or a virtual network) which can be accessed via a social networking web site or a dedicated client such as Twitter, Facebook, Orkut, and so forth. In an embodiment of the invention, the first user and the second users may be friends via the social computer network. The second transceiver 1104 may receive the first information at the second device(s). In an embodiment of the invention, the second adder 1108 at the second device may add the name of the TV program in the second synchronized multimedia list. In an embodiment of the invention, the name of the TV program may already be present in the second synchronized multimedia list.

At step 1210, a first message is displayed at one or more second devices based on the first information. The second display manager 1110 may display the first message at a display associated with the second device. The first message may be a pop-up message at the display of the second device. In an embodiment of the invention, the first message at the second device may be indicated by blinking a light, sounding an alarm, a visual reminder on the second device. For example, the light may be a Light Emitting Diode (LED) that may blink to indicate the request. The incoming first message may be an invitation to watch the selected TV program with the first user. The blinking pattern will inform or indicate to the second user about a new multimedia event. The multimedia communication manager will keep this blinking pattern until the program is over or until the second user accepts the invitation and joins the synchronized multimedia session for this TV program, or decides to reject it. In an exemplary scenario, the format of the message can be, "Would you like to watch <the TV program name from the service provider's program guide> with me? <Short URL>". A person skilled in the art will appreciate that the format of the message may differ depending on various hardware and software implementation of the multimedia communication manager at various devices. In an embodiment of the invention, the user A may insert customized information in the message or may customize the complete message. For example, the user A may insert a text describing the importance, a reason for preference of the program, or any other custom text or multimedia information.

At step 1212, the first information is processed to generate a synchronized multimedia session with the at least one second user and the first user. The multimedia communication manager at the second device processes the first information. The process of processing and establishing multimedia communication is explained in detail in FIG. 13A and FIG. 13B.

FIG. 13 illustrates a flowchart for establishing a synchronized interactive multimedia communication among a plurality of devices, in accordance with an embodiment of the invention. As discusses with reference to FIG. 2, the first device and the second device may exchange one or more messages and information to establish a synchronized interactive multimedia communication. The first device may include a multimedia communication manager configured to generate and transmit first information to second users. The multimedia communication manager is also configured to receive one or more messages from the second users or other devices via computer network. The second device includes a multimedia communication manager configured to receive and process the one or more messages to establish the synchronized multimedia session with the first device 202. The multimedia communication managers at both devices may include a social computer networking client such as Twitter client.

In an embodiment of the invention, the first device and the second device may not include the multimedia communication manager. The first device is connected to a home communication device such as the home communication device 302a including the multimedia communication manager 304a as shown in FIG. 3. Similarly, the second device may be connected to another home communication device such as the home communication device 302b including the multimedia communication manager 304b. As the first device and the second device does not include a multimedia communication manager, therefore, the functionality of the multimedia communication manager is provided by the multimedia communication manager(s) associated with the home communication devices connected to the first device and the second device respectively. Further, in such a case all the processing of the information or the messages may be done at the multimedia communication managers at the home communication devices. In another embodiment of the invention the multimedia communication manager is implemented as cloud based services, and the home communications device(s) include a web interface or a thin client providing an interface to the cloud based services.

With reference to FIG. 8 and FIG. 10, the multimedia communication manager 808 may include the first generator 1002, the first transceiver 1004, the first adder 1006, a call manager 1008, the user manager 1010, the device manager 1012, the first display manager 1014, and so forth.

With reference to FIG. 9 and FIG. 11, the multimedia communication manager 908 may include the second generator 1102, the first transceiver 1104, the analyzer 1106, the second adder 1108, and so forth. At step 1302, a first user at the first device (or a home communication device) may select a multimedia content such as a TV program. In an embodiment of the embodiment, the first user may select a multimedia content which he/she is currently viewing. In another embodiment of the invention, the first user may select a multimedia content or TV program which is scheduled to be telecasted in the future. In an embodiment of the invention, the first user may select the multimedia content from a program guide associated with a service provider. At step 1304, the multimedia communication manager associated with the first device (or the home communication device) may generate first information associated with the multimedia content based on one or more parameters at the first device. The one or more parameters can be, but are not limited to, an internet protocol (IP) address associated with the first device, details associated with the multimedia communication manager 206, time schedule associated with the multimedia content, a first Uniform Resource Locator (URL) associated with the multimedia content, service information wherein the service information may include a second URL associated with a third device, and so forth. The third device can be for example, a server or a service provider device. At step 1306, the first information is transmitted to one or more second users associated with a social computer network. The second users are connected to the first user of the first device via the social computer network. The one or more second users may be associated with one or more second devices. A first transceiver 1002 of the first device transmits the first information to the second user(s).

At step 1308, the first information is received at the one or more second devices from the social computer network.

The social computer network may be network (or a virtual network) which can be accessed via a social networking web site such as Twitter, Facebook, Orkut, and so forth or through a social networking client such as a Twitter client application. In an embodiment of the invention, the first user and the second users may be friends via the social computer network. The second transceiver 1104 may receive the first information at the second device(s). In an embodiment of the invention, the second adder 1108 at the second device may add the name of the TV program in the second synchronized multimedia list. In an embodiment of the invention, the name of the TV program may already be present in the second synchronized multimedia list.

At step 1310, a first message is displayed at one or more second devices based on the first information. The second display manager 1110 may display the first message at a display associated with the second device. The first message may be a pop-up message at the display of the second device. In an embodiment of the invention, the first message at the second device may be indicated by blinking a light, sounding an alarm, a visual reminder on the second device. For example, the light may be a Light Emitting Diode (LED) that may blink to indicate the request. The incoming first message may be an invitation to watch the selected TV program with the first user. The blinking pattern will inform or indicate to the second user about a new multimedia event. The multimedia communication manager will keep this blinking pattern until the program is over or until the second user accepts the invitation and joins the synchronized multimedia session for this TV program, or decides to reject it. In an exemplary scenario, the format of the message can be, "Would you like to watch <the TV program name from the service provider's program guide> with me? <Short URL>". A person skilled in the art will appreciate that the format of the message may differ depending on various hardware and software implementation of the multimedia communication manager at various devices. In an embodiment of the invention, the user A may insert customized information in the message or may customize the complete message. For example, the user A may insert a text describing the importance, a reason for preference of the program, or any other custom text or multimedia information.

At step 1312, the multimedia communication manager of the second device may search for an entry in a second synchronized multimedia list at the second device. The second synchronized multimedia list may include information related to candidate programs. At step 1314, it is checked whether the multimedia content or the TV program entry is present in the second synchronized multimedia list. If multimedia content is not present then at step 1316 the multimedia content is added to the second synchronized multimedia list. If the multimedia content is present in the second synchronized multimedia list then at step 1318, second information is generated based on an availability of the second user and a multimedia communication manager at the second device. In an embodiment of the invention, the second information may be generated by the second generator 1102. At step 1320, the second information is transmitted to the other users. The other users may include the first user and the other second users in the social computer network. The second information may include reply information or may also include information associated with a second multimedia content. The second multimedia content may be another TV program (or multimedia content) selected by the user B which is different from the TV program (or multimedia content) selected by the user A.

At step 1322, a second message may be displayed at the first device based on the second information. The second information may be processed by a processor of the multimedia communication manager associated with the first device as shown in FIG. 8. The first user at the first device may reply to the second message as described in FIG. 2 and FIG. 3. The second message may be displayed as a pop up message on a display of the first device. Further, the name of the second user may be added to the corresponding program entry in the multimedia list of candidate programs. The first user may be indicated about a new incoming message such as the second message by blinking a light, or sounding an alarm, or through a visual display at the display of the first device. Thereafter, at step 1324, a synchronized interactive multimedia communication is established between the second device and the first device based on the first and second information. Now the first device and the second device may interact with each other and control the program in a synchronized manner. Further, any of the users can terminate the communication.

FIG. 14 illustrates a flowchart for establishing a synchronized interactive multimedia communication among a plurality of devices, in accordance with another embodiment of the invention. As described with reference to FIG. 3, the first user may establish a multimedia communication for a session to be established in future such as a virtual play-date. Further, the first user and the second user may establish a future multimedia session by using one or more keys. The first user at the first device may create a profile corresponding to different users and can generate one or more keys which can be exchanged with the users with whom the first user wants to establish multimedia communication in the future. Similarly, a second user at the second device may create a profile and generate one or more keys which can be exchanged with other users for communication establishment. In an embodiment of the invention, the keys are then paired together.

At step 1402, the first user at the first device may create a first profile. In an embodiment of the invention, the first profile may describe a specific type of a multimedia session. Further, the first profile may include information regarding the synchronized multimedia session which will happen in the future. The details may be such as start time of the session, duration of the session, program types involved in the session, multimedia content allowed during the session, and so forth. In an embodiment of the invention, the multimedia communication manager associated with the first device may provide instructions or options to the first user to create the first profile. In an embodiment of the invention, multiple profiles may be created at the first device. In another embodiment of the invention, a user other than the first user may also create profile for the first user at the first device. For example, a mother A can create a profile at the home communication device for her kid A.

At step 1404, a first key for a first profile may be generated at the first device. The first key may be specific to a particular second user with whom the first user may want to establish a multimedia communication. For example, at first device, the key generated for a user B might be different from the key generated for user C. In an embodiment of the invention, the first key may be generated by the first generator at the multimedia communication manager of the first device based on first user's instructions. The key may include numbers, alphabets or combination of these. Further, the first key may be generated based on instructions of the other users other than the first user. For example, a mother A of the kid A may generate the first key to be used by the kid A.

At step 1406, a second profile at the second device for a specific type of a multimedia session may be generated. The second profile may include information regarding the synchronized multimedia session or communication that may happen in the future. The details may be such as start time of the session, duration of the session, program types involved in the session, multimedia content allowed during the session, and so forth. In an embodiment of the invention, the multimedia communication manager associated with the second device may provide instructions or options to the second user to create the second profile. In an embodiment of the invention, multiple profiles may be created at the second device. In another embodiment of the invention, a user other than the second user may also create profile for the second user at the second device. For example, a mother B can create a profile at the home communication device for her kid B.

At step 1410, a second key for the second profile is generated at the second device. The second generator may generate the second key based on the second user's instruction. The second generator is associated with the multimedia communication manager of the second device. The second key may include numbers, alphabets or combination of these. Further, the second key may be generated based on instructions of the other user other than the second user. For example, a mother B of the kid B may generate the second key to be used by the kid B.

At step 1410, the first user and the second user share keys. Keys can be shared physically, or via e-mail or via text messaging and similar methods. The first user shares the first key with the second user. In an embodiment of the invention, the first user may share the generated first key(s) with more than one user. Similarly, the second user may share the second key with the first user. In an embodiment of the invention, the second user may share the generated second key(s) with more than one user. The shared keys are paired together at the first and second devices and on the service provider's back-end server.

At step 1412, a synchronized interactive multimedia communication between the first device (or the first user) and the second device (or the second user) is established. The interactive communication is established according to the overlap between the two profiles which are being used. Thereafter, both users may interact accordingly. Any of the first user(s) or the second user(s) may terminate the multimedia communication.

The present invention discloses a method for establishing a synchronized interactive multimedia communication among a plurality of users or devices. The method includes generating, at a first device connected to a computer network, first information associated with a multimedia content selected by a first user, wherein the first information is generated based on one or more parameters. The one or more parameters can be, such as, but not limited to, an internet protocol (IP) address associated with the first device, the first device may include a multimedia communication manager, details associated with the multimedia communication manager, time schedule associated with the multimedia content, a first uniform resource locator (URL) associated with the multimedia content, service information including a second URL associated with a third device, and so forth. The third device may be a server or a service provider network. The method also includes transmitting, at the first device, the first information to at least one second user. Each of the at least one second user and the first user are associated with a social computer network. The method further includes receiving, at one or more second devices connected to the computer network, the first information. The method also includes, displaying, at the second devices, a semi-transparent pop up message corresponding to the first information. The method further includes replying to the displayed message by the at least one second user present at the second device(s) based on the availability of the at least one second user and availability of the multimedia communication manager at the second device(s). In an embodiment of the invention, the second user might not be close to the second device in such a case the second user may opt to reply later or may also reply via his/her mobile device such as a mobile phone. The mobile device may include a multimedia communication manager. Further, the first device and the second device(s) include a social networking client such as a Twitter client side application. The first user and the second user(s) may be connected to each other via a social network such as a social networking website. In an embodiment, when the second device does not include a multimedia communication manager, the second user may reply to the message by selecting the service information including the second URL so as to upgrade to the multimedia communication manager services and features. The method includes adding the multimedia content for which the invitation message has been received to a second synchronized multimedia list at the second device(s).

The second device may reply to the message by sending a second message to the first user. The second message may include, but not limited to, reply information associated with the multimedia content and information associated with a second multimedia content. In an embodiment of the invention, the multimedia content can be a real time content such as a currently airing TV program. In another embodiment of the invention, the multimedia content can be a content to be presented at a later time, such as a football match to be telecasted at a future time. The method may also include transmitting, to the one or more first users, a new time schedule associated with at least one of the multimedia content and a second multimedia content by the at least one second device, in order to reschedule the synchronized watching event. The second multimedia content may be a different program than the one embedded in the first information.

Further, the method includes adding the first user to a second viewers list. The second viewers list includes potential users with whom the second user would like to watch the multimedia content (or TV program). Further, the method includes, displaying a pop up message (or semi-transparent pop up message) at the first device indicating an arrival of a new message at the first device. Further, the method include, adding the second user to a first viewers list including potential users with whom the first user would like to watch a multimedia content. The method also includes adding the second multimedia content to a first synchronized multimedia list at the first device. The method includes, processing, at the second device(s), the first information to establish a synchronized multimedia interactive communication between at least one of the at least one second user and the first user. The presentation of the multimedia content in the synchronized interactive multimedia communication is synchronized among the first device and the one or more second devices. The synchronized interactive multimedia communication is performed along with the presentation of the multimedia content.

The present invention also discloses an apparatus for establishing a synchronized interactive multimedia communication among a plurality of users. The apparatus includes a first device and one or more second devices. The first device and the one or more second devices may be connected to a computer network. The first device and the second devices may also include a social networking client. The social networking client is associated with a social networking website such as Twitter, Facebook, Myspace, and so forth. The first device includes a first generator for generating first information based on one or parameters information associated with a multimedia content selected by a first user, wherein the first information is generated based on one or more parameters. The first device also includes a first transceiver configured to transmit the first information to at least one second user. The one or more second devices include a second transceiver configured to receive the first information from the social computer network.

Further, the second device(s) include a second analyzer configured to process the first information to establish a synchronized interactive multimedia communication between at least one of the at least one second user and the first user. The presentation of the multimedia content in the synchronized interactive multimedia communication is synchronized among the first device and the one or more second devices. The synchronized interactive multimedia communication is performed along with the presentation of the multimedia content. The one or more parameters may include information such as, but not limited to, an internet protocol (IP) address associated with the first device, wherein the first device comprises a multimedia communication manager, details associated with the multimedia communication manager, time schedule associated with the multimedia content, a first uniform resource locator (URL) associated with the multimedia content, and service information wherein the service information comprises a second URL associated with a third device.

The one or more devices may include a display unit configured to display a message corresponding to the first information. The message can be a semi-transparent pop up message. Thereafter, a second user at the second device (s) can reply to the message accordingly depending on the availability of a second user at the second device and/or availability of the multimedia communication manager at the second device. The second transceiver transmits the reply message and is configured to reply to the message based on a selection, by the at least one second user, of the service information when the one or more second device does not comprise the multimedia communication manager, wherein the service information comprises information for upgrading to the multimedia communication manager by the one or more second devices. In an embodiment of the invention, the second transceiver is further configured to receive, from a second user, a selection of one or more first users from which the first information is received for synchronizing the interactive multimedia communication.

The second transceiver is also configured to transmit second information to the one or more first users. The second information may include at least one of reply information associated with the multimedia content, and information associated with a second multimedia content. Further, the second transceiver is configured to transmit, to the one or more first users, a new time schedule associated with at least one of the multimedia content and the second multimedia content by the at least one second device, in order to reschedule the synchronized watching event.

The first transceiver of the first device is also configured to receive the second information from the one or more second devices. The first device also includes a first adder configured to add multimedia content to a first synchronized multimedia list. The first adder is also configured to add one or more second users associated with the one or more second device(s) to a first viewers list.

The second device includes a second adder configured to add the multimedia content to a second synchronized multimedia list; and add one or more first users associated with the one or more first devices from which the first information is received to a second viewers list.

In an embodiment of the invention, the first generator is also configured to generate a first key for authenticating the interactive multimedia communication. The first key is generated based on one or more first parameters provided by the first user. The one or more first parameters can be, but not limited to, information about programs, days, time allotted for each day, and specific programs to watch which are allowed for the first user on the first device. The first generator is further configured to generate a first profile associated with the at least one second user. The first transceiver is also configured to present the first key to each of the at least one second user for establishing the synchronized interactive multimedia communication. The first key is presented to the at least one second user by using at least one of Electronic-mail (E-mail), telephone, text message, instant message, and by writing on a paper.

In an embodiment of the invention, the second device include a second generator configured to generate the second key for authenticating the synchronized interactive multimedia communication, wherein the second key is generated based on one or more second parameters provided by the at least one second user. The one or more second parameters can be, but not limited to, information about programs, days, time allotted for each day, and specific programs to watch which are allowed for the second user on the second device. The second generator is further configured to generate a second profile associated with the at least one second user. Further, the second transceiver is configured to present a second key to the first user for establishing the synchronized interactive multimedia communication. The second key is presented to the first user by using at least one of Electronic-mail (E-mail), telephone, text message, instant message, and by writing on a paper. In another embodiment of the invention, the second analyzer is configured to process the first information to establish the synchronized interactive multimedia communication between the at least one of the first user or the at least one second user. The synchronized interactive multimedia communication is synchronized among the first device and the one or more second devices based on the first key and the second key. The synchronized multimedia interactive communication is performed along with the presentation of the multimedia content.

The first generator is also configured to generate one or more first profiles specific to at least one second user (s) based on the one or more first parameters at the first device. Examples of the one or more first parameters includes, but not limited to, program type, specific program name, days of week where the profile is active, hours of each day where the profile is active, and rating of the allowed programs on the first device. The second generator is also configured to generate one or more second profiles specific to the first user based on the one or more second parameters at the second device. The one or more second parameters include, but are not limited to, program type, specific program name, days of week where the profile is active, hours of each day where the profile is active, and rating of the allowed programs on the at least one second device.

In an embodiment of the invention, the first and the second profiles and the first and the second keys are paired together on the first and second device and on the service provider back-end server.

An advantage of the present invention is that the users may chat during synchronized multimedia session while viewing the multimedia content at the same time and control it together.

Embodiments of the invention are described above with reference to block diagrams and schematic illustrations of methods and systems according to embodiments of the invention. It will be understood that each block of the diagrams and combinations of blocks in the diagrams can be implemented by computer program instructions. These computer program instructions may be loaded onto one or more general purpose computers, special purpose computers, or other programmable data processing translator to produce machines, such that the instructions which execute on the computers or special purpose computers or other programmable data processing translator create means for implementing the functions specified in the block or blocks. Such computer program instructions may also be stored in a computer-readable memory or computer program products that can direct a computer or a special purpose computer or other programmable data processing apparatus to function in a particular manner, such that the instructions stored in the computer-readable memory produce an article of manufacture including instruction means that implement the function specified in the block or blocks.

While the invention has been described in connection with what is presently considered to be the most practical in various embodiments, it is to be understood that the invention is not to be limited to the disclosed embodiments, but on the contrary, is intended to cover various modifications and equivalent arrangements included within the spirit and scope of the appended claims. The invention has been described in the general context of computing devices, phone and computer-executable instructions, such as program modules, being executed by a computer. Generally, program modules include routines, programs, characters, components, data structures, etc., that perform particular tasks or implement particular abstract data types. A person skilled in the art will appreciate that the invention may be practiced with other computer system configurations, including hand-held devices, tablets, smart phones, multi-processor systems, microprocessor-based or programmable consumer electronics, network PCs, minicomputers, mainframe computers, set-top boxes, DVRs, HMGWs and the like. Further, the invention may also be practiced in a cloud based distributed computing worlds where tasks are performed by remote processing devices that are linked through a communications network. In a cloud based distributed computing world, program modules may be located in both local and remote memory storage devices.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for establishing a synchronized watching session among a plurality of users, the method comprising:
    establishing a synchronized interactive multimedia communication with presentation of multimedia content among the plurality of users, the establishing comprising:
        at a first device associated with a first user connected to a computer network:
            (a) enabling the first user to select a multimedia content for the synchronized watching session, wherein the multimedia content is selected from a plurality of multimedia contents provided by a service provider network;
            (b) generating an invitation request associated with the multimedia content selected by the first user, wherein the invitation request comprises a uniform resource locator (URL) associated with the selected multimedia content; and
            (c) transmitting the invitation request to a second user for initiating the synchronized watching session;
        at a second device associated with the second user connected to the computer network:
            (a) receiving the invitation request via a first message;
            (b) enabling the second user of the second device to accept or reject the received invitation request; and
            (c) if the invitation request is accepted by the second user, processing the URL to establish the synchronized watching session between the first user and the second user;
        wherein, the second user is a subscriber to the service provider network; and
        wherein the first device and the second device have a web interface to communicate with one or more services provided by the service provider network;
    enabling the first user to initiate the selected multimedia content in the established synchronized watching session after the second user has accepted the invitation request; and
    enabling the first user and the second user to chat while watching the synchronized multimedia content in the synchronized watching session.

2. The method of claim 1 wherein the first message is transmitted via email or a social computer network.

3. The method of claim 1 wherein the first message is transmitted via a short message service or an instant message.

4. A method for establishing a synchronized watching session among a plurality of users, the method comprising:
    establishing a synchronized interactive multimedia communication with presentation of multimedia content among the plurality of users, the establishing comprising:
        at a first device associated with a first user connected to a computer network:
            (a) enabling the first user to select a multimedia content for the synchronized watching session, wherein the multimedia content is selected from a plurality of multimedia contents provided by a service provider network;
            (b) generating an invitation request associated with the multimedia content selected by the first user, wherein the invitation request comprises a uniform resource locator (URL) associated with the selected multimedia content; and
   (c) transmitting the invitation request to a second user for initiating the synchronized watching session, wherein the invitation request is transmitted as a first message to the second user;
at one or more second devices associated with a second user connected to the computer network:
   (a) receiving the invitation request via the first message;
   (b) enabling the second user to accept the received invitation request; and
   (c) if the invitation request is accepted by the second user, processing the URL to establish the synchronized watching session;
wherein the second user is a subscribes to the service provider network; and
wherein the first device and the second device have a web interface to communicate with the services provided by the service provider network;
enabling the first user to initiate the selected multimedia content in the established synchronized watching session after the second user has accepted the invitation request;
enabling the first user and second user to interact while watching the synchronized multimedia content in the synchronized watching session; and
enabling both the first user and the second user to play, pause, rewind, and fast forward the selected multimedia content in the synchronized watching session.

5. The method of claim 4 wherein the first message is transmitted via email or a social computer network.

6. The method of claim 4 wherein the first message is transmitted via a short message service or an instant message.

7. A method for establishing a synchronized watching session among a plurality of users, the method comprising:
establishing a synchronized interactive multimedia communication with presentation of multimedia content among the plurality of users, the establishing comprising:
at a first device associated with a first user connected to a computer network:
   (a) enabling a first user to select a multimedia content for the synchronized watching session, wherein the multimedia content is selected from a plurality of multimedia contents provided by a service provider network;
   (b) generating an invitation request associated with the multimedia content selected by the first user, wherein the invitation request comprises a uniform resource locator (URL) associated with the selected multimedia content; and
   (c) transmitting the invitation request to a second user for initiating the synchronized watching session comprising the synchronized interactive multimedia communication, wherein the invitation request is transmitted as a first message to the second user;
at one or more second devices associated with the second user connected to the computer network:
   (a) receiving the invitation request via the first message;
   (b) enabling the second user to accept the received invitation request; and
   (b) if the invitation request is accepted by the second user, processing the URL to establish the synchronized watching session comprising the synchronized multimedia interactive communication between the first user and the second user;
wherein, the second user is a subscriber to the service provider network; and
wherein the first device and the second device have a web interface to communicate with the services provided by the service provider network;
enabling the first user to initiate the selected multimedia content in the established synchronized watching session after the second user has accepted the invitation request;
enabling the first user and second user to chat while watching the synchronized multimedia content in the synchronized watching session; and
enabling the first user to play, pause and rewind the selected multimedia content in the synchronized watching session.

8. The method of claim 7 wherein the first message is transmitted via email or a social computer network.

9. The method of claim 7 wherein the first message is transmitted via a short message service or an instant message.

\* \* \* \* \*